(12) United States Patent
Tsuchida et al.

(10) Patent No.: US 9,017,839 B2
(45) Date of Patent: Apr. 28, 2015

(54) ALL-SOLID LITHIUM SECONDARY BATTERY

(75) Inventors: Yasushi Tsuchida, Susono (JP); Fuminori Mizuno, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 605 days.

(21) Appl. No.: 12/864,003

(22) PCT Filed: Feb. 11, 2009

(86) PCT No.: PCT/IB2009/000234
§ 371 (c)(1), (2), (4) Date: Jul. 22, 2010

(87) PCT Pub. No.: WO2009/101501
PCT Pub. Date: Aug. 20, 2009

(65) Prior Publication Data
US 2010/0297479 A1    Nov. 25, 2010

(30) Foreign Application Priority Data
Feb. 12, 2008 (JP) ................. 2008-030898

(51) Int. Cl.
*H01M 10/0562* (2010.01)
*H01M 10/52* (2006.01)
*H01M 10/42* (2006.01)
*H01M 6/18* (2006.01)

(52) U.S. Cl.
CPC ...... *H01M 10/0562* (2013.01); *Y10T 29/49108* (2015.01); *H01M 6/18* (2013.01); *H01M 10/4242* (2013.01); *H01M 10/52* (2013.01); *H01M 2300/0068* (2013.01); *Y02E 60/122* (2013.01)

(58) Field of Classification Search
CPC ............ H01M 10/0562; H01M 10/52; H01M 10/4242; H01M 6/18; H01M 2300/0068; Y02E 60/122
USPC ........................... 429/49, 188, 304, 400, 479
See application file for complete search history.

(56) References Cited

U.S. PATENT DOCUMENTS 5,500,291 A * 3/1996 Minami et al. ................ 429/206
5,686,201 A * 11/1997 Chu ................................ 429/52

(Continued)

FOREIGN PATENT DOCUMENTS

EP    1 466 865 A1    10/2004
EP    1 515 388 A1    3/2005

(Continued)

OTHER PUBLICATIONS

Gould et al Thin Solid Films vol. 433 2003 pp. 309-314.pdf.*

(Continued)

*Primary Examiner* — Patrick Ryan
*Assistant Examiner* — Aaron Greso
(74) *Attorney, Agent, or Firm* — Oliff PLC

(57) ABSTRACT

An all-solid lithium secondary battery which uses a sulfide-based solid electrolyte material and has a power-generating element that has formed therein an oxide layer containing substantially no moisture, which is produced by oxidation of the sulfide-based solid electrolyte material in a zone where the electrolyte-containing layer containing at least the sulfide-based solid electrolyte material is in contact with an external air.

28 Claims, 9 Drawing Sheets

(56) References Cited

U.S. PATENT DOCUMENTS

| | | | |
|---|---|---|---|
| 6,025,094 A * | 2/2000 | Visco et al. | 429/231.95 |
| 6,911,280 B1 * | 6/2005 | De Jonghe et al. | 429/137 |
| 2008/0003492 A1 | 1/2008 | Bates | |
| 2010/0163325 A1 * | 7/2010 | Nakamura | 180/68.5 |

FOREIGN PATENT DOCUMENTS

| | | | |
|---|---|---|---|
| JP | A-6-279050 | 10/1994 | |
| JP | A-8-167425 | 6/1996 | |
| JP | A-2001-351615 | 12/2001 | |
| WO | WO 2007/004590 A1 | 1/2007 | |
| WO | WO 2007/132621 | * 11/2007 | H01M 2/22 |

OTHER PUBLICATIONS

Real Dictionary (Princeton University, Princeton University New Jersey USA 2001 and May 23, 2003 {http://www.realdictionary.com/?q=integral}.*

Ohtomo, T. et al., "Electrical and electrochemical properties of $Li_2S$—$P_2S_5$—$P_2O_5$ glass-ceramic electrolytes," *Journal of Power Sources*, 2005, pp. 715-718, vol. 146, published by Elsevier B.V.

International Search Report issued in International Patent Application No. PCT/IB2009/000234 on May 28, 2009.

Written Opinion of the International Searching Authority issued in International Patent Application No. PCT/IB2009/000234 on May 28, 2009.

* cited by examiner

ALL-SOLID LITHIUM SECONDARY BATTERY

BACKGROUND OF THE INVENTION

1. Field of the Invention

The invention relates to an all-solid lithium secondary battery in which a reaction between an electrolyte-containing layer including a sulfide-based solid electrolyte material and moisture contained in an external air can be inhibited and water resistance is increased.

2. Description of the Related Art

Following rapid spread of information device and communication devices such as personal computers, video cameras, and cellular phones in recent years, great importance was placed on the development of secondary batteries, for example, lithium secondary batteries that excel as power sources for such devices. In the fields other than those of the information-related devices and communication-related devices, for example, in the field of automotive industry, the development of high-output and high-capacity lithium secondary batteries was advanced for electric automobiles and hybrid automobiles as vehicles with a low environmental impact.

However, lithium secondary batteries that are presently available on the market use organic electrolytes including combustible organic solvents. As a result, it is necessary to install safety devices that inhibit temperature increase during short circuit and improve the structure and materials for preventing short circuiting.

By contrast, all-solid lithium secondary batteries in which a liquid electrolyte is replaced with a solid electrolyte and which have an all-solid structure use no combustible organic solvent inside the battery. As a result, the safety device can be simplified and the batteries excel in production cost and productivity The all-solid lithium secondary battery is formed, for example, by configuring a pellet having a three-layer configuration including a positive electrode, a solid electrolyte, and a negative electrode by a powder molding method, introducing the pellet into a conventional coin-type battery case or button-type battery case, and sealing the outer circumference of the case. In such an all-solid lithium secondary battery, the battery assembly group composed of the positive electrode, negative electrode, and electrolyte is an entirely solid body. As a result, electrochemical resistance of such a battery tends to increase and output current tends to decrease by comparison with those of lithium secondary batteries using an organic electrolyte.

Accordingly, in order to increase the output current of the all-solid lithium secondary battery, it is desirable to use an electrolyte with a high ion conductivity. Sulfide glass such as $Li_2S$—$SiS_2$, $Li_2S$—$B_2S_3$, and $Li_2S$—$P_2S_5$ demonstrate a high ion conductivity in excess of $10^{-4}$ S/cm. Furthermore, a high ion conductivity of about $10^{-3}$ S/cm can be obtained by adding LiI, $Li_3PO_4$ or the like. In glass based on these sulfides, polarization of sulfide ions is higher than that of oxide ions and electrostatic attraction with lithium ions is small, which is apparently why such glass demonstrates ion conductivity higher than that of oxide glass.

However, in a battery using a solid electrolyte material including the sulfides as the main components (sulfide-based solid electrolyte material), the sulfide-based solid electrolyte material has low water resistance and easily reacts with moisture. As a result, the sulfide-based solid electrolyte material easily deteriorates with generation of hydrogen sulfide.

As a method for inhibiting the deterioration of the sulfide-based solid electrolyte material caused by such reaction with moisture, for example, Japanese Patent Application Publication No. 8-167425 (JP-A-8-167425) discloses a manufacturing method by which a sulfide-based solid battery is assembled under a regenerated argon gas atmosphere from which moisture and/or oxygen has been removed. However, a problem associated with the sulfide-based solid battery obtained by such a method is that when the battery is used in an environment in which moisture is present, such as the atmosphere, the reaction of the sulfide-based solid electrolyte material with the moisture contained in the external air such as the atmosphere cannot be inhibited.

SUMMARY OF THE INVENTION

The invention provides an all-solid lithium secondary battery in which a reaction between an electrolyte-containing layer including a sulfide-based solid electrolyte material and moisture contained in the external air can be inhibited and water resistance is increased.

The first aspect of the invention resides in an all-solid lithium secondary battery using a sulfide-based solid electrolyte material. The all-solid lithium secondary battery includes a power-generating element having an electrolyte-containing layer including at least a sulfide-based solid electrolyte material; and an oxide layer containing substantially no moisture, which is produced by oxidation of the sulfide-based solid electrolyte material in a zone where the electrolyte-containing layer is in contact with an external air.

With such a configuration, a reaction between the electrolyte-containing layer including a sulfide-based solid electrolyte material and moisture contained in the external air can be inhibited and water resistance of the all-solid lithium secondary battery can be increased.

The electrolyte-containing layer may be a solid electrolyte layer, a positive electrode layer, and a negative electrode layer. Where sulfide-based solid electrolyte material is contained in the all the layers from among the solid electrolyte layer, positive electrode layer, and negative electrode layer, a Li ion conductivity mainly in the power-generating element including an oxide layer can be increased and performance of the all-solid lithium secondary battery can be increased.

A sulfur/oxygen element ratio of the oxide layer may be equal to or less than 3. In this case, deterioration of the electrolyte-containing layer by the reaction between the electrolyte-containing layer including a sulfide-based solid electrolyte material and moisture contained in the external air can be inhibited and water resistance of the all-solid lithium secondary battery can be increased.

The second aspect of the invention resides in a method for manufacturing an all-solid lithium secondary battery, including a step of exposing a power-generating element having an electrolyte-containing layer including a sulfide-based solid electrolyte material to an external air including moisture and causing the sulfide-based solid electrolyte material to absorb the moisture, thereby forming a deliquesced portion including an oxide at least in a zone where the electrolyte-containing layer is in contact with an external air; and a step of drying the deliquesced portion to remove the moisture and forming an oxide layer containing substantially no moisture, which is produced by oxidation of the sulfide-based solid electrolyte material.

In this case, a power-generating element including an oxide layer that has formed therein the oxide layer containing substantially no moisture can be easily obtained with good efficiency only in a zone of contact with moisture contained in the external air.

The third aspect of the invention resides in a regeneration method for an all-solid lithium secondary battery having a power-generating element including an oxide layer that has formed therein the oxide layer containing substantially no moisture, which is produced by oxidation of a sulfide-based solid electrolyte material in a zone where an electrolyte-containing layer including at least the sulfide-based solid electrolyte material is in contact with an external air. The regeneration method includes a step of detecting whether a deliquesced portion including an oxide has been formed in the power-generating element including an oxide layer by detecting hydrogen sulfide after the all-solid lithium secondary battery has been used; and drying the deliquesced portion to remove moisture after the formation of the deliquesced portion has been detected and regenerating the oxide layer containing substantially no moisture, which is produced by oxidation of the sulfide-based solid electrolyte material.

In this case, even when the oxide layer deteriorates due to cracking induced therein by volume changes during charging and discharging or by external forces, the oxide layer can be regenerated, the deterioration of the oxide layer produced by oxidation of the sulfide-based solid electrolyte material can be restored, and the all-solid lithium secondary battery can be regenerated.

The fourth aspect of the invention resides in a regeneration device for an all-solid lithium secondary battery having a power-generating element including an oxide layer that has formed therein the oxide layer containing substantially no moisture, which is produced by oxidation of a sulfide-based solid electrolyte material in a zone where an electrolyte-containing layer including at least the sulfide-based solid electrolyte material is in contact with an external air. The regeneration device for an all-solid lithium secondary battery has an external packaging body where the power-generating element including an oxide layer is air tightly sealed; a drying device capable of drying the inside of the external packaging body and removing moisture therefrom; a hydrogen sulfide sensor installed inside the external packaging body; and a controller that actuates the drying device so as to dry the inside of the external packaging body and remove moisture therefrom and to regenerate the oxide layer containing substantially no moisture, which is produced by oxidation of the sulfide-based solid electrolyte material, on the basis of detection of hydrogen sulfide contained in the external packaging body by the hydrogen sulfide sensor.

In this case, even when the oxide layer deteriorates due to cracking induced therein by volume changes during charging and discharging or by external forces, the oxide layer can be regenerated, the deterioration of the oxide layer produced by oxidation of the sulfide-based solid electrolyte material can be restored, and the all-solid lithium secondary battery can be regenerated.

According to the invention, the reaction between an electrolyte-containing layer including a sulfide-based solid electrolyte material and moisture contained in the external air can be inhibited and an all-solid lithium secondary battery with increased water resistance can be obtained.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

Figure 1:
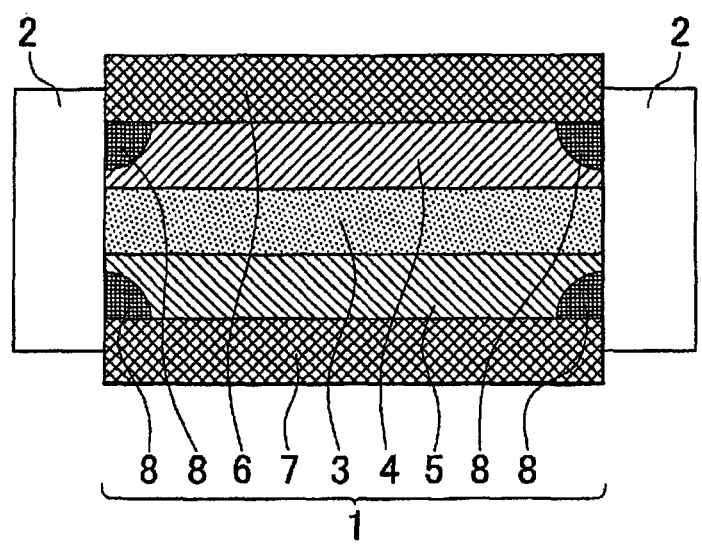
FIG. 1 is a schematic cross-sectional view illustrating an example of configuration of an all-solid lithium secondary battery that is an embodiment of the invention.

An all-solid lithium secondary battery that is an embodiment of the invention, a method for manufacturing the all-solid lithium secondary battery, a regeneration method for the all-solid lithium secondary battery, and an all-solid lithium secondary battery regeneration device will be described below in greater detail.

A. All-Solid Lithium Secondary Battery

An all-solid lithium secondary battery is an all-solid lithium secondary battery using a sulfide-based solid electrolyte material, the battery having a power-generating element that has formed therein oxide layer produced by oxidation of the sulfide-based solid electrolyte material and contains substantially no moisture in a zone where an electrolyte-containing layer including at least the sulfide-based solid electrolyte material is in contact with an external air.

With such a configuration, because the all-solid lithium secondary battery has the power-generating element including an oxide layer, water resistance of the battery can be increased. Thus, the power-generating element has formed therein the oxide layer produced by oxidation of the sulfide-based solid electrolyte material and contains substantially no moisture in a zone where an electrolyte-containing layer including at least the sulfide-based solid electrolyte material is in contact with an external air. As a result, the reaction of the sulfide-based solid electrolyte material located in the power-generating element including an oxide layer with moisture contained in the external air is inhibited, deterioration of the sulfide-based solid electrolyte material accompanied by generation of hydrogen sulfide and the like can be inhibited, and water resistance is increased. By using such a power-generating element including an oxide layer makes it possible to increase water resistance of the all-solid lithium secondary battery.

"External air" as referred to in the present description is an atmosphere surrounding the power-generating element including an oxide layer when it is used "as is" as an all-solid lithium secondary battery, without being covered with a battery case or the like. Furthermore, when the side surface of the power-generating element including an oxide layer is covered with a member such as an insulating ring that is brought into direct contact therewith and the structure obtained is used as an all-solid lithium secondary battery, the "external air" is an atmosphere surrounding the all-solid lithium secondary battery including the member such as an insulating ring and the power-generating element including an oxide layer. For example, when the power-generating element including an oxide layer is covered with a coin-shaped battery case and the structure obtained is used as the all-solid lithium secondary battery, the "external air" is an atmosphere surrounding the coin-shaped battery case. For example, when there is a space such as a gap between the power-generating element including an oxide layer and a battery case, an external packaging body or the like, for example in a case where the power-generating element including an oxide layer is covered with a laminate-type battery case or in a case where the power-generating element including an oxide layer is installed in a predetermined external packaging body or the like, the "external air" is an atmosphere present in the space such as a gap.

The all-solid lithium secondary battery will be described below with reference to the appended drawings. FIG. 1 shows an example of the all-solid lithium secondary battery. As shown in FIG. 1, in the all-solid lithium secondary battery, a side surface of a power-generating element 1 including an oxide layer is covered with an insulating ring 2. The power-generating element 1 including an oxide layer has a solid electrolyte layer 3, a positive electrode layer 4 installed on one surface of the solid electrolyte layer 3, a negative electrode layer 5 installed on the other surface of the solid electrolyte layer 3, a positive electrode collector 6 installed on the side of the positive electrode layer 4 that is opposite that of the solid electrolyte layer 3, a negative electrode collector 7 installed on the side of the negative electrode layer 5 that is opposite that of the solid electrolyte layer 3, and an oxide layer 8 containing substantially no moisture, which is produced by oxidation of a sulfide-based solid electrolyte material, this oxide layer being formed in zones where electrolyte-containing layers (solid electrolyte layer 3, positive electrode layer 4, and negative electrode layer 5) including the sulfide-based solid electrolyte material are in contact with the external air. In accordance with the invention, it is preferred that all the electrolyte-containing layers, that is, the solid electrolyte layer 3, positive electrode layer 4, and negative electrode layer 5, be electrolyte-containing layers including the sulfide-based solid electrolyte material because such a configuration usually makes it possible, as described hereinabove, to increase a Li ion conductivity within the power-generating element including an oxide layer. Such an all-solid lithium secondary battery is not particularly limited, provided that it has the power-generating element including oxide layer. In addition to the configuration shown by way of example in FIG. 1, the power-generating element including an oxide layer may be covered with a battery case of a coin type, laminate type, or the like, or a configuration that has no insulating ring or battery case covering the power-generating element including an oxide layer may be also used. The all-solid lithium secondary battery and a method for the manufacture thereof will be successively described below in greater detail.

1. Power-Generating Element Including an Oxide Layer

In the power-generating element, as shown by way of example in the above-described FIG. 1, an oxide layer containing substantially no moisture, which is produced by oxidation of a sulfide-based solid electrolyte material is formed in a zone where the electrolyte-containing layer including at least the sulfide-based solid electrolyte material is in contact with an external air. Because the power-generating element has the oxide layer in a zone where the electrolyte-containing layer contained in the power-generating element, contact of the electrolyte-containing layer contained in the power-generating element with the external air can be inhibited. As a result, deterioration of the electrolyte-containing layer caused by deliquescence and generation of hydrogen sulfide and the like is inhibited and water resistance of the power-generating element including an oxide layer can be increased. The constituents of the power-generating element including an oxide layer will be described below.

(1) Oxide Layer

The oxide layer produced by oxidation of a sulfide-based solid electrolyte material will be described below. The oxide layer is formed in a zone where at least the electrolyte-containing layer contained in the power-generating element is in contact with the external air, and the oxide layer contains substantially no moisture. Because the oxide layer has water resistance higher than that of the electrolyte-containing layer, contact of the electrolyte-containing layer with the external air can be inhibited and deliquescence of the electrolyte-containing layer caused by moisture or the like contained in the external air can be inhibited. Furthermore, the oxide layer contains substantially no moisture, and deliquescence of the electrolyte-containing layer caused by moisture contained in the oxide layer is also inhibited. Because such an oxide layer produced by oxidation of the sulfide-based solid electrolyte material is present, water resistance of the power-generating element including an oxide layer can be increased, and an all-solid lithium secondary battery with increased water resistance, a high output, and high stability can be obtained.

A zone for forming the oxide layer is not particularly limited and may be a zone where at least the electrolyte-containing layer contained in the power-generating element including an oxide layer is in contact with the external air. A specific zone can be appropriately selected according to the below-described type of the electrolyte-containing layer, form of the battery, presence or absence of the battery case. For example, in the case illustrated by FIG. 1 in which the electrolyte-containing layers include the solid electrolyte layer 3, positive electrode layer 4, and negative electrode layer 5 and the side surface of the power-generating element 1 including an oxide layer is brought into direct contact with and covered by a member such as insulating ring 2 or the like, the aforementioned zone can be a zone where the oxide layer 8 is produced by oxidation of the sulfide-based solid electrolyte material, such as shown in FIG. 1, that is, a zone in the vicinity of a boundary between the positive electrode collector 6 in the cross section of the power-generating element 1 including an oxide layer and the insulating ring 2 and a zone in the vicinity of a boundary between the negative electrode collector 7 and the insulating ring 2.

Figure 2:
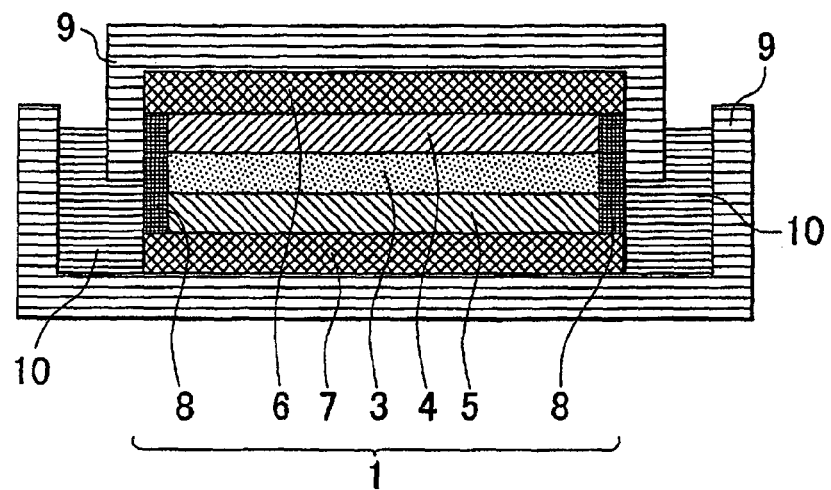
FIG. 2 is a schematic cross-sectional view illustrating an example of configuration of an all-solid lithium secondary battery that is an embodiment of the invention.
Figure 3:
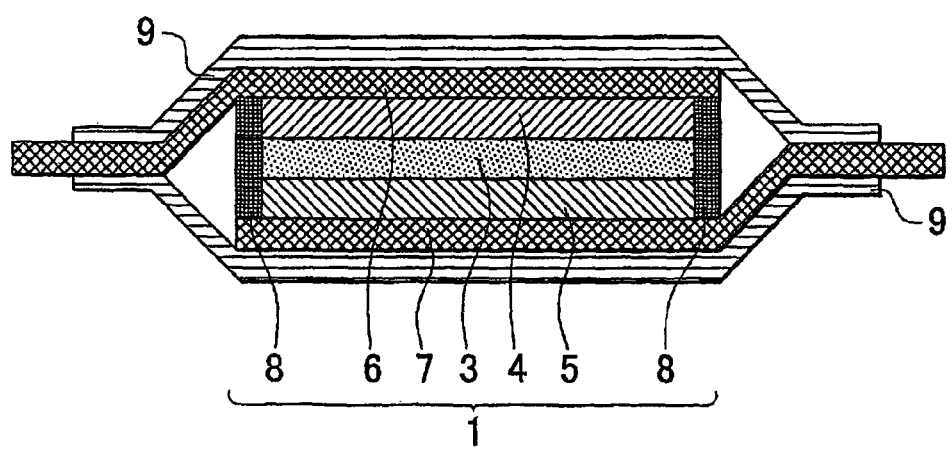
FIG. 3 is a schematic cross-sectional view illustrating an example of configuration of an all-solid lithium secondary battery that is an embodiment of the invention.
Figure 4:
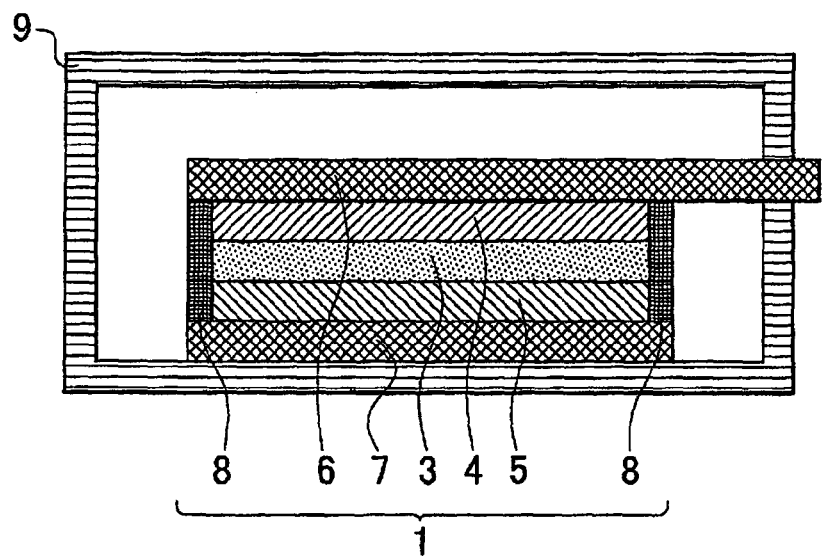
FIG. 4 is a schematic cross-sectional view illustrating an example of configuration of an all-solid lithium secondary battery that is an embodiment of the invention.

Furthermore, in the case in which the electrolyte-containing layers include the solid electrolyte layer 3, positive electrode layer 4, and negative electrode layer 5 and there is no member that comes into direct contact and covers the side surface of the power-generating element 1 including an oxide layer, for example, when the power-generating element 1 including an oxide layer is simply installed in a coin-type battery case shown in FIG. 2, a laminate-type battery case shown in FIG. 3, and the battery case 9 such as shown in FIG. 4, the aforementioned zones may be zones having formed therein the oxide layer 8 such as shown by way of examples in FIGS. 2 to 4, that is, zones over the entire side surface of the electrolyte-containing layer in the cross section of the power-generating element 1 including an oxide layer.

Figure 5:
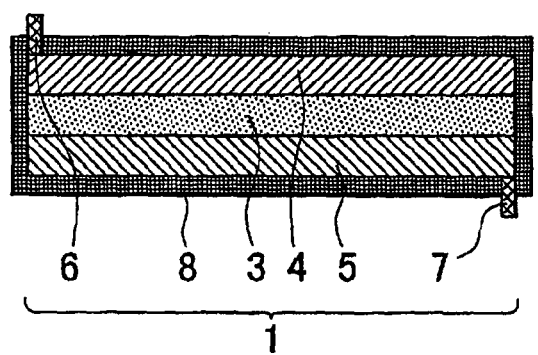
FIG. 5 is a schematic cross-sectional view illustrating an example of configuration of an all-solid lithium secondary battery that is an embodiment of the invention.

Further, for example, a configuration may be also employed in which, as shown in FIG. 5, the electrolyte-containing layers include the solid electrolyte layer 3, positive electrode layer 4, and negative electrode layer 5, and a zone over the entire surface of the electrolyte-containing layer outside the portion where current collection is performed is a zone where the oxide layer 8 is formed.

Figure 6:
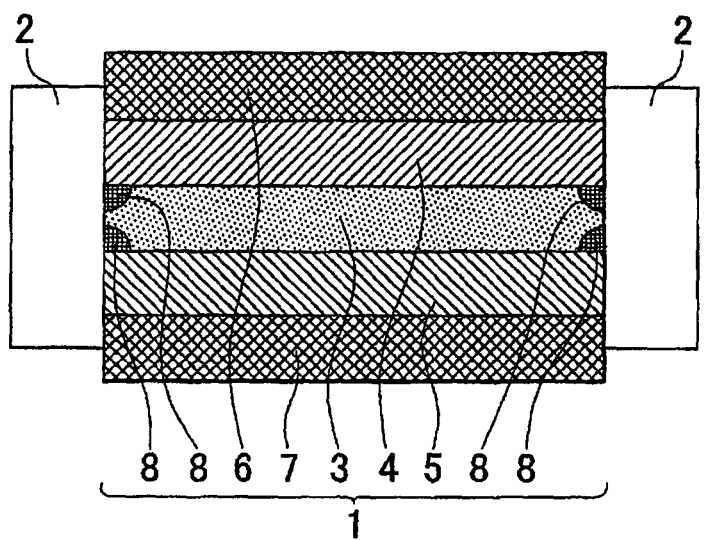
FIG. 6 is a schematic cross-sectional view illustrating an example of configuration of an all-solid lithium secondary battery that is an embodiment of the invention.

For example, in the case illustrated by FIG. 6 in which the electrolyte-containing layer is only the solid electrolyte layer 3 (the positive electrode layer 4 and negative electrode layer 5 contain no sulfide-based solid electrolyte material) and the side surface of the power-generating element 1 including an oxide layer is brought into direct contact with and covered by a member such as insulating ring 2 or the like, the aforementioned zone can be a zone where the oxide layer 8 is produced by the oxidation of the sulfide-based solid electrolyte material, such as shown in FIG. 6, that is, a zone in the vicinity of a boundary between the positive electrode layer 4 in the cross section of the power-generating element 1 including an oxide layer and the insulating ring 2 and a zone in the vicinity of a boundary between the negative electrode layer 5 and the insulating ring 2.

Figure 7:
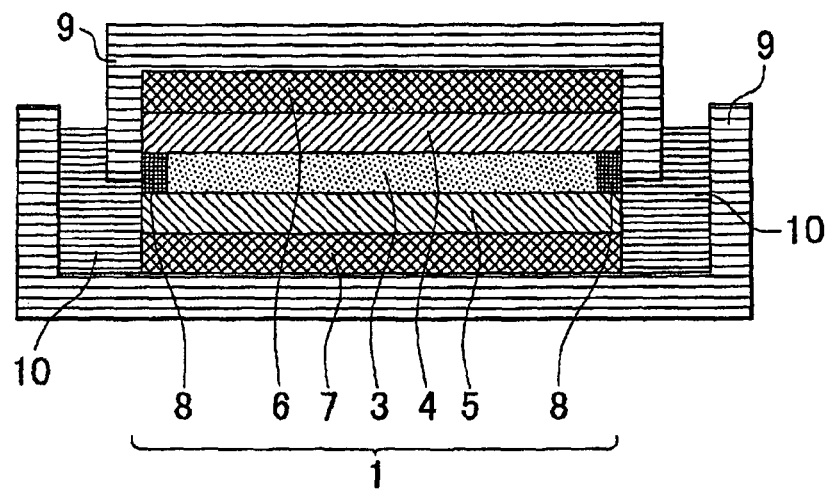
FIG. 7 is a schematic cross-sectional view illustrating an example of configuration of an all-solid lithium secondary battery that is an embodiment of the invention.
Figure 8:
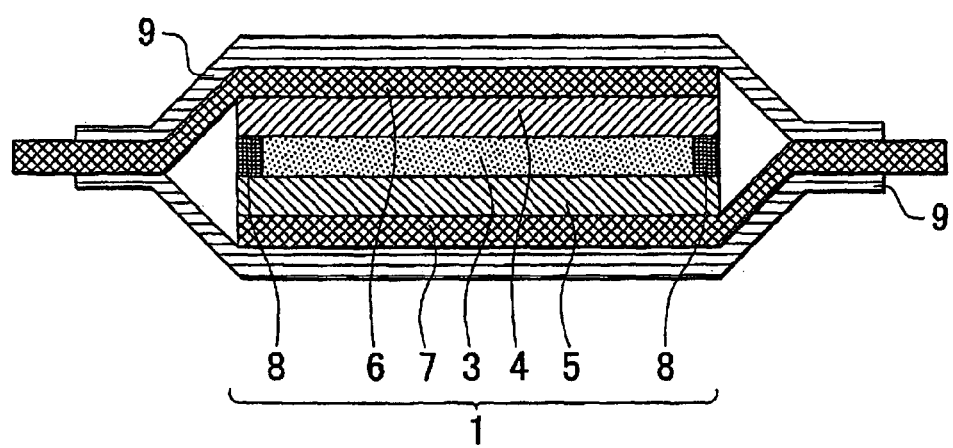
FIG. 8 is a schematic cross-sectional view illustrating an example of configuration of an all-solid lithium secondary battery that is an embodiment of the invention.
Figure 9:
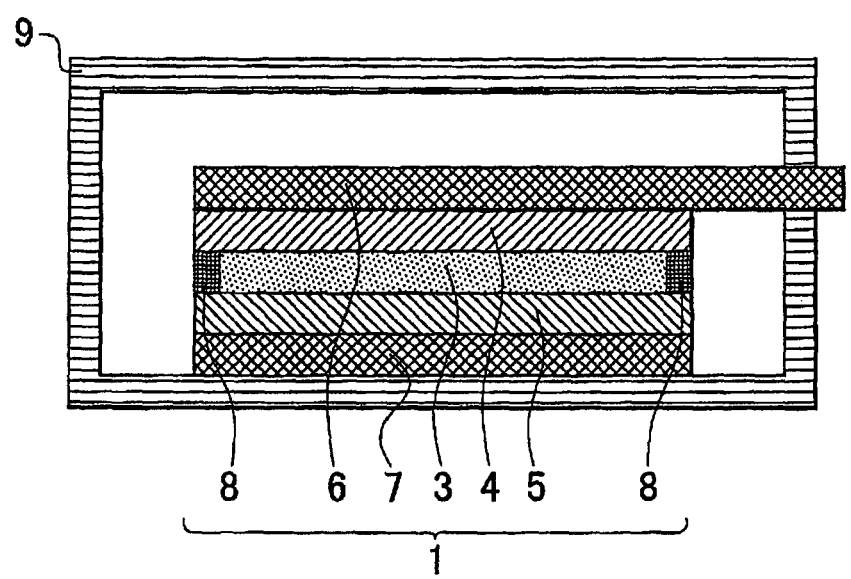
FIG. 9 is a schematic cross-sectional view illustrating an example of configuration of an all-solid lithium secondary battery that is an embodiment of the invention.

Furthermore, in the case in which the electrolyte-containing layer includes only the solid electrolyte layer 3 and there is no member that comes into direct contact and covers the side surface of the power-generating element 1 including an oxide layer, for example, when the power-generating element 1 including an oxide layer is simply installed in a coin-type battery case shown in FIG. 7, a laminate-type battery case shown in FIG. 8, and the battery case 9 such as shown in FIG. 9, or when the power-generating element 1 including an oxide layer is used as is, without being installed in a battery case or the like, the aforementioned zone may be a zone having formed therein the oxide layer 8 such as shown by way of examples in FIGS. 7 to 9, that is, zones over the entire side surface of the electrolyte-containing layer (layer including a solid electrolyte) in the cross section of the power-generating element 1 including an oxide layer.

As described hereinabove, by forming the oxide layer in a zone where at least the electrolyte-containing layer is in contact with the external air, it is possible to increase water resistance of the power-generating element including an oxide layer. However, when the oxide layer 8 is formed in a zone over almost the entire surface of the electrolyte-containing layer, as shown by way of example in FIG. 5, although the degradation of the electrolyte-containing layer accompanied by the generation of hydrogen sulfide or the like can be inhibited, the resistance of the battery can increased. This is because, electrons have low mobility in the oxide layer produced by oxidation of the sulfide-based solid electrolyte material and lithium ion conductivity becomes about 1/100 that of the sulfide-based solid electrolyte. From this standpoint, in accordance with the invention, it is preferred that the oxide layer be not formed in a zone where electrons move or lithium ion conduction is performed, for example, in zones such as between the positive electrode layer and the positive electrode collector, between the negative electrode layer and the negative electrode collector, between the solid electrolyte layer and the positive electrode layer, and between the solid electrolyte layer and the negative electrode layer.

The oxide layer produced by oxidation of the sulfide-based solid electrolyte material contains substantially no moisture. Because substantially no moisture is contained, the reaction between the sulfide-based solid electrolyte and the moisture can be inhibited and water resistance can be increased. The expression "contains substantially no moisture" as used in the present description means the amount of moisture such that substantially no hydrogen sulfide is generated by the reaction between the sulfide-based solid electrolyte and the moisture contained in the oxide layer. The specific moisture content in the oxide layer that thus contains substantially no moisture is preferably equal to or less than 1000 ppm, more preferably equal to or less than 100 ppm, and especially preferably equal to or less than 10 ppm.

For example, a value measured by using a Karl-Fischer Hygroscope (manufactured by Hiranuma Sangyo KK) can be used as the moisture content in the oxide layer.

The sulfur/oxygen element ratio in the oxide layer is not particularly limited provided that it enables the inhibition of the deterioration of the electrolyte-containing layer accompanying the generation of hydrogen sulfide and the increase in water resistance of the power-generating element including an oxide layer. The sulfur/oxygen element ratio in the oxide layer is preferably, for example, equal to or less than 3, more preferably within a range of 1 to 3, and especially preferably within a range of 2 to 2.5. This is because the deterioration of the electrolyte-containing layer accompanying the generation of hydrogen sulfide caused by the reaction between the electrolyte-containing layer including the sulfide-based solid electrolyte material and moisture contained in the external air can be inhibited more reliably and water resistance can be further increased. As will be described below, the sulfur/oxygen element ratio in the oxide layer can be controlled by controlling, for example, the exposure time of the power-generating element including an oxide layer in the atmosphere, the number of exposure cycles, and the number of drying cycles.

A value obtained by measurements with an XPS device (ESCALAB 220iXL, manufactured by VG Scientific) can be used as the sulfur/oxygen element ratio in the oxide layer.

The content of the oxide layer is not particularly limited, provided that water resistance of the power-generating element including an oxide layer can be increased, but where the content of the oxide layer is too high, the battery resistance can increase. Therefore, it is preferred that the content of the oxide layer be as low as possible. This is because where excess oxide layer is present in the solid electrolyte layer, positive electrolyte layer, and negative electrolyte layer, the speed of lithium ion conduction in the oxide layer is degraded with respect to that in the sulfide-based solid electrolyte material. As a result, the battery output can decrease and battery resistance can greatly increase. A volume fraction of the oxide layer in the electrolyte-containing layers such as shown in FIGS. 1 to 5 ((oxide layer volume)/(oxide layer volume+ electrolyte-containing layer volume)×100) (%), which represents the content of the oxide layer in the electrolyte-containing layers is preferably, for example, equal to or less than 5%, more preferably equal to or less than 3%, and especially preferably equal to or less than 1%.

(2) Electrolyte-Containing Layer

The electrolyte-containing layer is a layer including the above-described sulfide-based solid electrolyte material. When the electrolyte-containing layer is used in the all-solid lithium secondary battery, the output current of the all-solid lithium secondary battery can be increased. Thus, because sulfide ions have a polarization higher than that of oxide ions and electrostatic attraction thereof with lithium ions is small, the sulfide-based solid electrolyte material has an ion conductivity higher than oxide-based solid electrolyte materials. As a result, by introducing an electrolyte-containing layer including the sulfide-based solid electrolyte material, it is possible to obtain a high output current of the all-solid lithium secondary battery.

The electrolyte-containing layer as referred to herein is, as described hereinabove, a layer including the sulfide-based solid electrolyte material, for example, a solid electrolyte layer, a positive electrode layer, and a negative electrode layer. Only the solid electrolyte layer may be an electrolyte-containing layer including the sulfide-based solid electrolyte material, or either of the positive electrode layer and the negative electrode layer, in addition to the solid electrolyte layer, may be electrode-containing layers including the sulfide-based solid electrolyte material. It is usually preferred that the solid electrolyte layer, the positive electrode layer, and the negative electrode layers are all the electrolyte-containing layers including the sulfide-based solid electrolyte material. This is because Li ions can move within the sulfide-based solid electrolyte material demonstrating a high ion conductivity, and a Li ion conductivity within the power-generating element including an oxide layer can be increased.

The solid electrolyte layer is not particularly limited provided that it has a function of a solid electrolyte layer and includes a sulfide-based solid electrolyte material. Specific examples of the sulfide-based solid electrolyte material include sulfide-based solid electrolyte materials (Li-A-S) including Li, A, and S. A in the sulfide-based solid electrolyte materials Li-A-S is at least one species selected from the group including P, Ge, B, Si, and I. Specific examples of such sulfide-based solid electrolyte material Li-A-S include $70Li_2S-30P_2S_5$, $LiGe_{0.25}P_{0.75}S_4$, $80Li_2S-20P_2S_5$, and $Li_2S-SiS_2$. $70Li_2S-30P_2S_5$ is especially preferred because it has a high ion conductivity.

A method for manufacturing the sulfide-based solid electrolyte material of the present embodiment is not particularly limited, provided that the desired sulfide-based solid electrolyte material can be obtained. For example, the sulfide-based solid electrolyte material can be manufactured, for example, by converting a starting material including Li and S into glass in a planetary ball mill and then performing heat treatment.

A thickness of the solid electrolyte layer is not particularly limited, and a solid electrolyte layer with a thickness equal that of a solid electrolyte layer used in the usual all-solid lithium secondary battery can be employed.

The positive electrode layer is not particularly limited, provided that it can function as a positive electrode layer. This layer may be composed only of a positive electrode material or of a positive electrode mixed material obtained by mixing a positive electrode material with a solid electrolyte material, and a material identical to that used in a typical all-solid lithium secondary battery can be used. Examples of materials for forming the positive electrode layer include a positive electrode mixed material obtained by mixing $LiCoO_2$ as a positive electrode active mass and $70Li_2S-30P_2S_5$ as a solid electrolyte material. An electrically conductive additive such as acetylene black, Ketjen black, and carbon fibers may be introduced to increase electric conductivity.

A thickness of the positive electrode layer is not particularly limited, and a positive electrode layer with a thickness equal that of a positive electrode layer used in the usual all-solid lithium secondary battery can be employed.

The negative electrode layer is not particularly limited, provided that it can function as a negative electrode layer. This layer may be composed of a negative electrode mixed material obtained by mixing a negative electrode material with a solid electrolyte material, and a material identical to that used in a typical all-solid lithium secondary battery can be used. Examples of materials for forming the negative electrode layer include a negative electrode mixed material obtained by mixing graphite as a negative electrode active mass and $70Li_2S-30P_2S_5$ as a solid electrolyte material. An electrically conductive additive such as acetylene black, Ketjen black, and carbon fibers may be introduced to increase electric conductivity.

A thickness of the negative electrode layer is not particularly limited, and a negative electrode layer with a thickness equal that of a negative electrode layer used in the usual all-solid lithium secondary battery can be employed.

(3) Positive Electrode Collector and Negative Electrode Collector

The positive electrode collector performs current collection of the positive electrode layer. The positive electrode collector is not particularly limited, provided it can function as a positive electrode collector. A material of the positive electrode collector is not particularly limited, provided it has electric conductivity. Examples of suitable materials include stainless steel (SUS), aluminum, nickel, iron, titanium, and carbon. Among them, SUS is preferred. The positive electrode collector may be a dense collector or a porous collector.

The negative electrode collector performs current collection of the negative electrode layer. The negative electrode collector is not particularly limited, provided it can function as a negative electrode collector. A material of the negative electrode collector is not particularly limited, provided it has electric conductivity. Examples of suitable materials include SUS, copper, nickel, and carbon. Among them, SUS is preferred. The description relating to a dense metal collector and, a porous metal collector in the negative electrode collector is identical to that relating to a dense metal collector and a porous metal collector in the positive electrode collector and this description is herein omitted.

Furthermore, the positive electrode collector and the negative electrode collector may also function as a battery case. More specifically, a battery case made from SUS can be prepared and part thereof can be used as the collector.

2. Other

In the all-solid lithium secondary battery, components other than the above-described power-generating element including an oxide layer, for example, an insulating ring, a battery case, or a resin packing used for sealing a coin-type battery, are not particularly limited and components similar to those of a typical all-solid lithium secondary battery can be used. More specifically a battery case made from a metal, for example, SUS can be used. Furthermore, a resin with low hygroscopicity, for example, an epoxy resin is preferred as a resin packing.

3. Method for Manufacturing all-Solid Lithium Secondary Battery

A method for manufacturing an all-solid lithium secondary battery is not particularly limited, provided that the above-described all-solid lithium secondary battery can be obtained. For example, a method described in section "B. Method for manufacturing all-solid lithium secondary battery" below can be used.

4. Application

The application of the all-solid lithium secondary battery in accordance with the invention is not particularly limited, and this all-solid lithium secondary battery can be used for vehicles or the like.

5. Form

The form of the all-solid lithium secondary battery in accordance with the invention is not particularly limited. For example, a configuration in which the side surface of the above-described power-generating element including an oxide layer is brought into contact and covered with an insulating ring, a configuration using a coin-shaped battery case, a configuration using a laminate-type battery case, and the configuration in which the above-described power-generating element including an oxide layer is used "as is", without covering with a battery case or the like, can be employed.

B. Method for Manufacturing all-Solid Lithium Secondary Battery

A method for manufacturing all-solid lithium secondary battery of the present embodiment includes an exposure step in which a power-generating element having an electrolyte-containing layer including a sulfide-based solid electrolyte material is exposed to an external air including moisture and the sulfide-based solid electrolyte material is caused to absorb the moisture, thereby forming a deliquesced portion including an oxide at least in a zone where the electrolyte-containing layer including the sulfide-based solid electrolyte material is in contact with an external air and forming a power-generating element including a deliquesced portion; and a drying step in which the deliquesced portion is dried to remove the moisture, an oxide layer containing substantially no moisture, which is produced by oxidation of the sulfide-based solid electrolyte material is formed, and a power-generating element including an oxide layer is obtained.

With the aforementioned exposure step in which a power-generating element having an electrolyte-containing layer including a sulfide-based solid electrolyte material is exposed to an external air including moisture, moisture is absorbed at least in a zone of the power-generating element where the electrolyte-containing layer including the sulfide-based solid electrolyte material is in contact with the external air, thereby making it possible to form the deliquesced portion including an oxide and obtain a power-generating element including a deliquesced portion. With the subsequent drying step of drying the deliquesced portion, it is possible to obtain a power-generating element having formed therein the oxide layer containing no moisture with good efficiency only in a zone of contact with the moisture contained in the external air. Therefore, a reaction of the electrolyte-containing layer including the sulfide-based solid electrolyte material with the moisture contained in the external air can be inhibited, deterioration of the electrolyte-containing layer can be inhibited, and an all-solid lithium secondary battery with increased water resistance, high output, and high stability can be obtained. Furthermore, by controlling the time and number of exposure cycles and the number of drying cycles, it is possible to control a sulfur/oxygen element ratio of the oxide layer to a desired level. Thus, an oxide layer in which deterioration of the sulfide-based solid electrolyte material can be inhibited more reliably can be formed and water resistance can be further increased.

With such a method for manufacturing an all-solid lithium secondary battery, it is possible to obtain an all-solid lithium secondary battery via the following specific steps. For example, in the case of forming an all-solid lithium secondary battery having an insulating ring, such as shown in the above-described FIGS. 1 and 6, a solid electrolyte layer formation step is performed in which a sulfide-based solid electrolyte material is press molded and a solid electrolyte layer is formed and then a positive electrode layer formation step is performed in which a positive electrode layer is formed by disposing a positive electrode mixed material composed of a positive electrode material and a solid electrolyte material, or only the positive electrode material on one side of the solid electrolyte layer and then press molding is performed. A negative electrode layer formation step is then performed in which a negative electrode layer is formed by disposing a negative electrode mixed material composed of a negative electrode material and a solid electrolyte material, or only the negative electrode material on the surface of the solid electrolyte layer opposite that on which the positive electrode layer has been formed and press molding is then performed. A collector installation step is then performed in which a power-generating element is obtained by sandwiching the obtained configuration in which the solid electrolyte layer is sandwiched between the positive electrode layer and the negative electrode layer between collectors, so that a positive electrode collector is installed on the positive electrode layer and a negative electrode collector is installed on the negative electrode layer. A battery cell formation step is then performed in which an insulating ring is installed so as to cover the side surface of the obtained power-generating element and a battery cell is formed. An exposure step is then performed in which the obtained battery cell is exposed for a predetermined time to an external air including moisture and at least a zone where the electrolyte-containing layer including the sulfide-based solid electrolyte material is in contact with the external air is caused to absorb the moisture, thereby forming a deliquesced portion including an oxide and obtaining a power-generating element including a deliquesced portion. A drying step is then performed in which the power-generating element including a deliquesced portion is dried under the predetermined conditions to remove the moisture from the deliquesced portion and form the oxide layer. As a result, the above-described desired all-solid lithium secondary battery can be obtained.

Furthermore, for example, when an all-solid lithium secondary battery is formed that has a power-generating element in which the oxide layer is formed on the entire side surface, without using a member such as an insulating ring that is in direct contact with and covers the side surface of the power-generating element, such as shown in FIGS. 2, 3, 4, 7, 8, and 9, the power-generating element is first obtained via the above-described solid electrolyte layer formation step, positive electrode layer formation step, negative electrode layer formation step, and collector installation step. An exposure step is then performed in which the obtained power-generating element is exposed for a predetermined time to an external air including moisture and at least a zone where the electrolyte-containing layer including the sulfide-based solid electrolyte material is in contact with the external air is caused to absorb the moisture, thereby forming a deliquesced portion including an oxide and obtaining a power-generating element including a deliquesced portion. A power-generating element including an oxide layer is then obtained via a drying step in which the power-generating element including a deliquesced portion is dried under the predetermined conditions to remove the moisture from the deliquesced portion and form the oxide layer produced by oxidation of the sulfide-based solid electrolyte material. A battery cell formation step is then performed in which the obtained power-generating element including an oxide layer is installed, for example, in a coin-shaped battery case and then sealed with a resin packing to form a battery cell. As a result, the above-described desired all-solid lithium secondary battery can be obtained.

Furthermore, when an all-solid lithium secondary battery is formed, for example, by using a power-generating element in which the oxide layer is formed in a zone over the entire surface of the electrolyte-containing layer outside a portion where current collection is performed, such as shown in the above-described FIG. 5, first, the above-described solid electrolyte layer formation step, positive electrode layer formation step, and negative electrode layer formation step are preformed, and a power-generating element is obtained in which only the solid electrolyte layer is sandwiched by the positive electrode layer and the negative electrode layer and no collector is provided. An exposure step is then performed in which the power-generating element in which no collector is provided is then exposed for a predetermined time to an external air including moisture and at least a zone where the electrolyte-containing layer including the sulfide-based solid electrolyte material is in contact with the external air is caused to absorb moisture, thereby forming a deliquesced portion including an oxide and obtaining a power-generating element including the deliquesced portion in which no collector is installed. A drying step is then performed by conducting drying under the predetermined conditions, removing moisture from the deliquesced portion, and forming an oxide layer produced by oxidation of the sulfide-based solid electrolyte material. As a result, a power-generating element including an oxide layer in which no collector has been installed is obtained. Then, a collector installation step is performed in which, for example, fine collectors are installed in portions obtained by local stripping, for example, by cutting out the oxide layer, and a power-generating element including an oxide layer is obtained. A battery cell formation step is then performed in which the obtained power-generating element including an oxide layer is installed, for example, in a coin-shaped battery case and then sealed with a resin packing thereby forming a battery cell. As a result, the above-described desired all-solid lithium secondary battery can be obtained.

In the method for manufacturing an all-solid lithium secondary battery, the drying step is performed after the exposure step to form the desired oxide layer, but the oxide layer may be also formed by alternately repeating the exposure step and the drying step a plurality of times.

The above-described method for manufacturing an all-solid lithium secondary battery in accordance with the invention is not particularly limited, provided that it includes at least the exposure step and the drying step, and this method may include other steps. Each step of the method for manufacturing an all-solid lithium secondary battery in accordance with the invention will be described below in greater detail.

1. Exposure Step

The exposure step is a step in which a power-generating element having an electrolyte-containing layer including a sulfide-based solid electrolyte material is exposed to an external air including moisture, thereby causing moisture absorption at least in a zone of the power-generating element where the electrolyte-containing layer including the sulfide-based solid electrolyte material is in contact with the external air, and thus forming the deliquesced portion including an oxide and obtaining a power-generating element including a deliquesced portion to be used in the below-described drying step.

Via the above-described step, the deliquesced portion including an oxide is formed by causing the power-generating element having the electrolyte-containing layer including the sulfide-based solid electrolyte material to absorb moisture at least in a zone where the electrolyte-containing layer including the sulfide-based solid electrolyte material is in contact with the external air, and a power-generating element including a deliquesced portion can thus be obtained. Because the sulfide-based solid electrolyte material has high reactivity with moisture, deliquescence accompanied by generation of hydrogen sulfide is induced by the reaction with moisture. This is why the power-generating element including a deliquesced portion that has formed therein a deliquesced portion including an oxide can be obtained.

The power-generating element including a deliquesced portion that is obtained in the present step is a power-generating element in which the deliquesced portion including an oxide is formed at least in a zone of the power-generating element having the electrolyte-containing layer including the sulfide-based solid electrolyte material where the electrolyte-containing layer including the sulfide-based solid electrolyte material is in contact with the external air. The composition of the deliquesced portion including an oxide is formed by the reaction of the sulfide-based solid electrolyte material and moisture, contained in the external air and changes depending e.g. on a type of the sulfide-based solid electrolyte material. Thus, this composition is not particularly limited.

The zone for forming the deliquesced portion including an oxide may be a zone of the power-generating element having the electrolyte-containing layer including the sulfide-based solid electrolyte material where the electrolyte-containing layer including at least the sulfide-based solid electrolyte material is in contact with the external air. This zone differs depending e.g. on the form of the exposed power-generating element and is not particularly limited.

The content of the deliquesced portion including an oxide is not particularly limited, provided that the amount thereof can increase water resistance of the power-generating element including an oxide layer obtained after the below-described drying step. However, where the content of the oxide layer is too high, the performance of battery may be adversely affected, for example, the speed at which lithium ion are conducted in the oxide layer may be reduced. Therefore, it is preferred that the content of the deliquesced portion be such that the oxide layer formed after the below-described drying step is as small as possible.

The power-generating element used in the present step has the electrolyte-containing layer including the sulfide-based solid electrolyte material. For example, a configuration in which the electrolyte-containing layers are the solid electrolyte layer, positive electrode layer, and negative electrode layer and the solid electrolyte layer is sandwiched between the positive electrode layer and the negative electrode layer can be sandwiched between collectors so that a positive electrode collector is installed on the positive electrode layer and the negative electrode collector is installed on the negative electrode layer. Furthermore, when the entire surface of the electrolyte-containing layer outside the current collection portion is covered with the oxide layer, as shown in the above-described FIG. 5, the entire surface of the electrolyte-containing layer is usually made deliquescent in the present step before the collectors are installed and then the below-described drying step is performed. Therefore, a power-generating element in which no collectors are installed may be obtained. The electrolyte-containing layer, solid electrolyte layer, positive electrode layer, negative electrode layer, positive electrode collector, and negative electrode collector are similar to those described in the section "A. All-solid lithium secondary battery" above and the explanation thereof is herein omitted.

An exposure method used in the present step is not particularly limited, provided that the power-generating element including a deliquesced portion can be obtained, and the usually employed methods can be used. More specifically, a method can be used by which a power-generating element including an oxide layer including a sulfide-based solid electrolyte material is allowed to stay for a predetermined time in an external air having predetermined temperature and humidity.

The exposure conditions such as the aforementioned temperature, humidity, and time are not particularly limited provided that they enable the formation of the deliquesced portion including an oxide by causing moisture absorption in the zone of the power-generating element having the electrolyte-containing layer including at least the sulfide-based solid electrolyte material where the electrolyte-containing layer including the sulfide-based solid electrolyte material is in contact with the external air. For example, the exposure conditions such as the aforementioned temperature, humidity, and time, such that enable the formation of the oxide layer in the desired amount can be determined, for example, by performing the exposure step and the below-described drying step as a preliminary test in the atmosphere.

The external air is not particularly limited, provided that the deliquesced portion including an oxide can be formed by causing moisture absorption at least in the zone of the power-generating element where the electrolyte-containing layer including the sulfide-based solid electrolyte material is in contact with the external air. Usually, the atmospheric air is preferred because it is readily available.

Furthermore, in the present step, when an all-solid lithium secondary battery is obtained that uses an insulating ring such as shown by way of example in FIG. 1, it is preferred that exposure to the external air including moisture be performed after covering the side surface of the power-generating element with the insulating ring. This is because the side surface of the power-generating element is covered with the insulating ring, air tightness is lower than that in the case of using a sealed battery case, as the above-described coin-shaped case, and deliquescence can be induced by controlling the temperature or humidity of the external air. Another reason is that only a portion that is in contact with the moisture contained in the external air can be deliquesced with good efficiency. From this standpoint, when a member such as the above-described insulating ring is used to be in direct contact with and cover the side surface of the power-generating element, it is preferred that the present step be performed after the below-described battery cell formation step. Meanwhile, when an all-solid lithium secondary battery is obtained that uses a coin-shaped case shown in FIG. 2, a laminate-shaped case shown in FIG. 3, and a battery case with high air tightness, such as shown in FIG. 4, it is preferred that the power-generating element be exposed to the external air including moisture in a state in which the power-generating element is not air-tightly closed with the battery case. This is because when the power-generating element is installed in a battery case with high air tightness, moisture can hardly penetrate into the battery case and the power-generating element is difficult to deliquesce even when the temperature or humidity of the external air is controlled. From this standpoint, when the above-described battery case with high air tightness is used, it is preferred that the present step be performed before the below-described battery cell formation step.

2. Drying Step

The drying step is a step in which the power-generating element including a deliquesced portion obtained in the exposure step is used, the deliquesced portion is dried, moisture is removed, an oxide layer, containing substantially no moisture, which is produced by oxidation of the sulfide-based solid electrolyte material is formed, and a power-generating element including an oxide layer is obtained.

Via this step, a power-generating element in which the oxide layer containing substantially no moisture is formed can be obtained with good efficiency only in a zone that is in contact with the moisture contained in the external air. The deliquesced portion including an oxide in the power-generating element is formed with good efficiency only in a zone that is in contact with the moisture contained in the external air. Thus, by drying the deliquesced portion and removing the moisture, it is possible to form the oxide layer containing substantially no moisture with good efficiency only in a zone that is in contact with the moisture contained in the external air and obtain the desired power-generating element including an oxide layer. The power-generating element including an oxide layer can inhibit deterioration of the sulfide-based solid electrolyte material and makes it possible to obtain an all-solid lithium secondary battery with increased water resistance, high output, and high stability.

The drying method used in the present step is not particularly limited, provided that the power-generating element including an oxide layer can be obtained, and a usually employed method can be used. More specifically, a method can be used that enables drying the power-generating element including a deliquesced portion under predetermined atmosphere, temperature, and time conditions.

The drying conditions are not particularly limited, provided that the deliquesced portion in the power-generating element including a deliquesced portion can be dried to remove moisture, an oxide layer including the sulfide-based solid electrolyte material and containing substantially no moisture can be formed with good efficiency only in a zone that is in contact with the moisture contained in the external air, and the desired power-generating element including an oxide layer can be obtained. For example, the drying conditions e.g. the drying temperature, time, and atmosphere, such that enable the formation of the oxide layer in the desired amount can be determined, for example, by performing the exposure step and the present step as a preliminary test in the atmosphere.

The atmosphere during drying is not particularly limited, provided that the deliquesced portion can be dried and moisture can be removed therefrom and that the oxide layer containing substantially no moisture can be formed. For example, the drying can be performed under vacuum.

Furthermore, in the present step, when an all-solid lithium secondary battery is produced that uses an insulating ring, such as shown by way of example in FIG. 1, it is preferred that the power-generating element including a deliquesced portion be dried in a state in which it is covered with the insulating ring. This is because in the state in which the side surface of the power-generating element is covered with the insulating ring, air tightness is lower than that in the case of using the above-described air-tight battery case of a coin shape or the like and drying can be performed under controlled drying temperature and atmosphere. Another reason is that the oxide layer containing substantially no moisture can be formed with good efficiency only in a zone that is in contact with the moisture contained in the external air. From this standpoint, when a member such as the above-described insulating ring is used to be in direct contact with and cover the side surface of the power-generating element, it is preferred that the present step be performed after the below-described battery cell formation step. Meanwhile, when an all-solid lithium secondary battery is obtained that uses a coin-shaped case shown in FIG.

2, a laminate-shaped case shown in FIG. 3, and a battery case with high air tightness, such as shown in FIG. 4, it is preferred that power-generating element including a deliquesced portion be dried in a state in which it is not air-tightly sealed with the battery case. This is because when the power-generating element including a deliquesced portion is installed in a battery case with high air tightness, moisture contained in the battery case is difficult to remove and drying is difficult to perform even under controlled drying temperature, atmosphere, and the like. From this standpoint, when the above-described battery case with high air tightness is used, it is preferred that the present step be performed before the below-described battery cell formation step.

The power-generating element including a deliquesced portion that is used in the present step is similar to that described in "B. Method for manufacturing all-solid lithium secondary battery; 1. Exposure step". Therefore, the description thereof is herein omitted. Furthermore, the power-generating element including an oxide layer is similar to that described in "A. All-solid lithium secondary battery; 1. Power-generating element including oxide layer". Therefore, the description thereof is herein omitted.

3. Other Steps

The method for manufacturing the all-solid lithium secondary battery in accordance with the invention is not particularly limited, provided that it includes at least the above-described exposure step and drying step. However, the manufacturing method usually includes the following steps in addition to the above-described exposure step and drying step: a solid electrolyte layer formation step in which a sulfide-based solid electrolyte material is press molded and a solid electrolyte layer is formed; a positive electrode layer formation step in which a positive electrode layer is formed by disposing a positive electrode mixed material composed of a positive electrode material and a solid electrolyte material, or only the positive electrode material on one side of the solid electrolyte layer and then press molding is performed; a negative electrode layer formation step in which a negative electrode layer is formed by disposing a negative electrode mixed material composed of a negative electrode material and a solid electrolyte material, or only the negative electrode material on the surface of the solid electrolyte layer opposite that on which the positive electrode layer has been formed and press molding is then performed; a collector installation step in which a power-generating element is obtained by sandwiching the obtained configuration in which the solid electrolyte layer is sandwiched between the positive electrode layer and the negative electrode layer between collectors, so that a positive electrode collector is installed on the positive electrode layer and a negative electrode collector is installed on the negative electrode layer; and a battery cell formation step in which an insulating ring is installed so as to cover the side surface of the obtained power-generating element, or the obtained power-generating element is installed and air-tightly sealed inside a batter case and a battery cell is formed. Because these steps are similar to those performed in the manufacture of a typical all-solid lithium secondary battery, the explanation thereof is herein omitted. Moreover, because the features of the obtained all-solid lithium secondary battery are similar to those described in section "A. All-solid lithium secondary battery", the explanation thereof is herein omitted.

C. Regeneration Method for all-Solid Lithium Secondary Battery

A regeneration method for an all-solid lithium secondary battery of the present embodiment is a regeneration method for an all-solid lithium secondary battery having a power-generating element in which the oxide layer is formed by oxidation of a sulfide-based solid electrolyte material and contains substantially no moisture in a zone where an electrolyte-containing layer including at least the sulfide-based solid electrolyte material is in contact with an external air. The method includes a step of detecting whether a deliquesced portion including an oxide has been formed in the power-generating element including an oxide layer by detecting hydrogen sulfide after the all-solid lithium secondary battery has been used; and a step of drying the deliquesced portion to remove moisture after the formation of the deliquesced portion has been detected and regenerating the oxide layer containing substantially no moisture.

When the oxide layer deteriorates due to cracking induced in the oxide layer by volume changes during charging and discharging or by external forces or because of appearance of a deliquesced portion that contains water, the sulfide-based solid electrolyte material contained in the power-generating element including an oxide layer comes into contact with moisture originating from the external air or the like. As a result, the sulfide-based solid electrolyte material and the moisture react, hydrogen sulfide is generated, and a deliquesced portion including an oxide that is produced by the reaction of the sulfide-based solid electrolyte material with the moisture is formed in the deteriorated portion of the oxide layer. In the present embodiment, the deterioration of the oxide layer and the like can be detected by detecting hydrogen sulfide, for example, with a hydrogen sulfide sensor after the all-solid lithium secondary battery has been used. Furthermore, when the deterioration of the oxide layer or the like is detected, the deliquesced portion can be driven by a predetermined method. As a result, it is possible to dry the deliquesced portion, remove moisture therefrom, and regenerate the oxide layer that contains substantially no moisture in the deteriorated portion. Therefore, even when the oxide layer deteriorates after the battery has been used, it is possible to regenerate the oxide layer in the deteriorated portion, restore the deterioration of the oxide layer, and regenerate the all-solid lithium secondary battery.

Such a regeneration method for an all-solid lithium secondary battery is not particularly limited, provided that the all-solid lithium secondary battery can be regenerated after the battery has been used. More specifically, the all-solid lithium secondary battery can be regenerated by the following method. For example, after the all-solid lithium secondary battery having the power-generating element including an oxide layer, such as shown in the above-described FIG. 1, has been used, the concentration of hydrogen sulfide in the vicinity of the all-solid lithium secondary battery is detected by using a method capable of detecting hydrogen sulfide, such as a detection method using a hydrogen sulfide sensor. When the detected concentration of hydrogen sulfide is at a level requiring the regeneration of the all-solid lithium secondary battery, the all-solid lithium secondary battery is sealed inside a predetermined external packaging body. The inside of the external packaging body is then dried with an external device capable of drying by removing moisture, such as a separately provided evacuation device. By performing such a drying for a desired time, it is possible to dry the deliquesced portion in the power-generating element including an oxide layer, remove moisture therefrom, regenerate the oxide layer containing substantially no moisture in the deteriorated portion, and regenerate the all-solid lithium secondary battery.

Furthermore, for example, when a configuration is used in which the all-solid lithium secondary battery having the power-generating element including an oxide layer, such as shown in FIG. 1, and a hydrogen sulfide sensor are installed in advance inside an external packaging body, where hydrogen sulfide is generated after the all-solid lithium secondary battery has been used, the hydrogen sulfide can be detected with the hydrogen sulfide sensor located in the external packaging body. An alarm lamp or the like is installed such that the alarm lamp or the like is turned on by a signal from the hydrogen sulfide sensor when the detected hydrogen sulfide concentration is at a level requiring the regeneration of the all-solid lithium secondary battery. When the alarm lamp or the like is turned on, the inside of the external packaging body is dried with an external device capable of drying by removing moisture, such as a separately provided evacuation device. By performing such a drying for a desired time, it is possible to dry the deliquesced portion in the power-generating element including an oxide layer, remove moisture therefrom, regenerate the oxide layer containing substantially no moisture in the deteriorated portion, and regenerate the all-solid lithium secondary battery.

Figure 10:
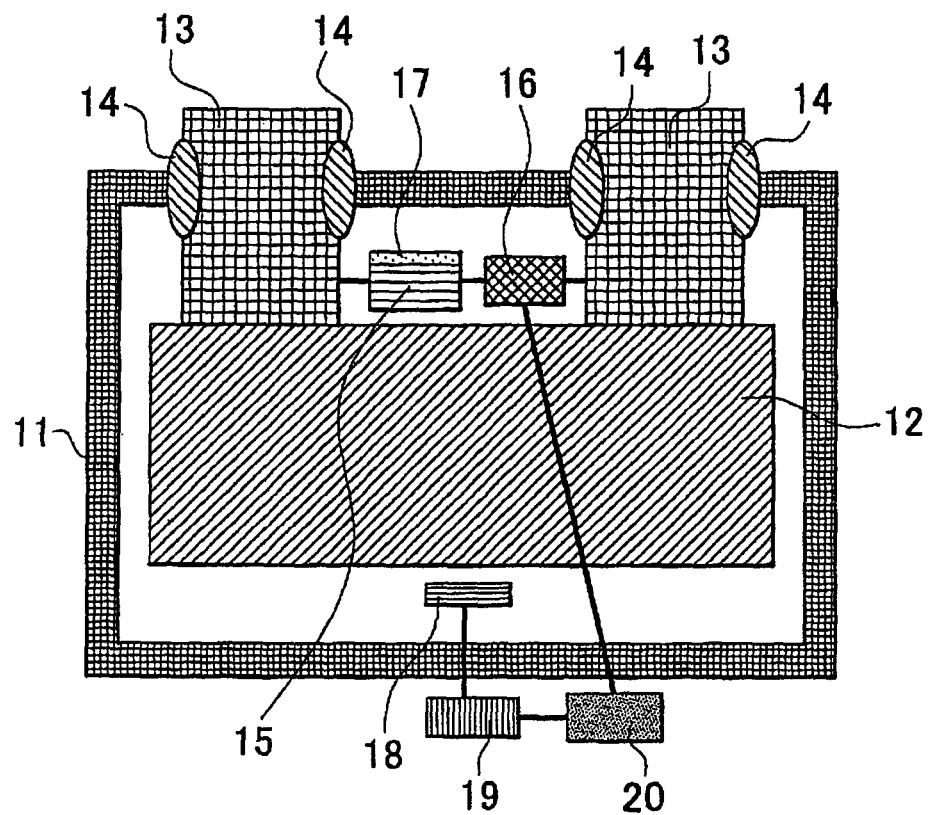
FIG. 10 is a schematic cross-sectional view illustrating an example of configuration of an all-solid lithium secondary battery regeneration device that is an embodiment of the invention.

For example, the regeneration can be performed with a regeneration device for an all-solid lithium secondary battery, such as shown in a schematic general cross-sectional view in FIG. 10. In the regeneration device for an all-solid lithium secondary battery shown by way of example in FIG. 10, a power-generating element 12 including an oxide layer is installed inside an external packaging body 11 and terminals 13 are formed at one surface of the power-generating element 12 including an oxide layer, the terminals 13 extending to the outside of the external packaging body 11. A gap between the terminal 13 and the external packaging body 11 is sealed with insulating portions 14. A cooling element (Peltier element) 15 and a switch 16 are installed between the terminals 13 so that a voltage between the terminal can be used, and a moisture absorbent 17 is installed on the cooling element 15. Furthermore, a hydrogen sulfide sensor 18 is installed below the power-generating element 12 including an oxide layer in the lower portion of the external packaging body 11. A computational unit 19 for computing the concentration of hydrogen sulfide from the signal of the hydrogen sulfide sensor 18 and an engine control unit (ECU) 20 are installed outside the external packaging body 11. The ECU performs electric controls such that when the computed and outputted hydrogen sulfide concentration is equal to or higher than a certain set value, this signal is processed, a signal is sent to the switch 16, and the cooling element 15 is actuated. In such a regeneration device for an all-solid lithium secondary battery, when deterioration occurs, for example, due to cracking in the oxide layer formed in the power-generating element 12 including an oxide layer and the sulfide-based solid electrolyte material located in the power-generating element 12 including an oxide layer comes into contact and reacts with moisture originating from the external air or the like, hydrogen sulfide is generated. The hydrogen sulfide fills the inside of the external packaging body 11. Because the atmosphere inside the external packaging body 11 is usually the atmosphere, hydrogen sulfide, which is heavier than air, fills the lower inner portion of the external packaging body. This hydrogen sulfide can be detected with the hydrogen sulfide sensor 18. Because the computational unit 19 and ECU 20 are set so as to send a signal to the switch 16 and actuate the cooling element 15 when the detected hydrogen sulfide concentration reaches a predetermined value, moisture contained inside the external packaging body can be adsorbed on the moisture adsorber 17 located on the cooling element 15, and the inside of the external packaging body 11 can be dried. As a result, the deliquesced portion including the oxide formed due to deterioration of the oxide layer can be dried, moisture can be removed therefrom, and the oxide layer containing substantially no moisture in the deteriorated portion can be regenerated.

Furthermore, a regeneration device for an all-solid lithium secondary battery such as shown by way of example in the below-described section "D. Regeneration device for all-solid lithium secondary battery" may be also used in addition to the device shown by way of example in FIG. 10 as the regeneration device for an all-solid lithium secondary battery. As thus described, the deteriorated all-solid lithium secondary battery can be regenerated.

More specific conditions for regenerating the deteriorated all-solid lithium secondary battery, that is, conditions (drying time and the like) under which the deliquesced portion including the oxide formed due to deterioration of the oxide layer can be dried, moisture can be removed therefrom, and the oxide layer containing substantially no moisture in the deteriorated portion can be regenerated, differ depending on the regeneration method used, degree to which the oxide layer has deteriorated, size of the all-solid lithium secondary battery, size of the external packaging body, and the like. These conditions are not particularly limited, provided that the oxide layer containing substantially no moisture in the deteriorated portion can be regenerated and the deteriorated all-solid lithium secondary battery can be regenerated. More specifically, the desired conditions can be determined by preliminary tests or the like.

A method for detecting hydrogen sulfide is not particularly limited, provided that hydrogen sulfide can be detected. It is usually preferred that the detection be performed with a hydrogen sulfide sensor because of high utility and general availability thereof.

The external device capable of drying the inside of the external packaging body is not particularly limited, provided that moisture located inside the external packaging body can be removed and dried, and the oxide layer containing substantially no moisture in the portion where the oxide layer has deteriorated can be regenerated. For example, an evacuation device such as a vacuum pump can be used. Any generally employed alarm lamp can be used as the aforementioned alarm lamp.

The all-solid lithium secondary battery having the power-generating element including an oxide layer of the present embodiment is similar to that described in the section "A. All-solid lithium secondary battery" above and, therefore, the explanation thereof is herein omitted.

The external packaging body, hydrogen sulfide sensor, and regeneration device for an all-solid lithium secondary battery are similar to those described in the section "D. Regeneration device for all-solid lithium secondary battery" below and, therefore, the explanation thereof is herein omitted.

D. Regeneration Device for all-Solid Lithium Secondary Battery

A regeneration device for an all-solid lithium secondary battery of the present embodiment will be described below in detail. In the regeneration device, a power-generating element that has formed therein the oxide layer containing substantially no moisture, which is produced by oxidation of a sulfide-based solid electrolyte material in a zone where an electrolyte-containing layer having at least the sulfide-based solid electrolyte material is in contact with an external air is air tightly sealed in an external packaging body. The regeneration device has a drying device capable of drying the inside of the external packaging body and removing moisture therefrom and a hydrogen sulfide sensor installed inside the external packaging body. When the hydrogen sulfide sensor detects hydrogen sulfide contained in the external packaging body, the device for drying the inside of the external packaging body is actuated, the inside of the external packaging body is dried, moisture is removed therefrom, and the oxide layer containing substantially no moisture, which is produced by oxidation of the sulfide-based solid electrolyte material is regenerated.

When the oxide layer deteriorates due to cracking induced in the oxide layer by volume changes during charging and discharging or by external forces or because of appearance of a deliquesced portion that contains water, the sulfide-based solid electrolyte material contained in the power-generating element including an oxide layer comes into contact with moisture originating from the external air or the like. As a result, the sulfide-based solid electrolyte material and the moisture react and hydrogen sulfide is generated. The regeneration device has the hydrogen sulfide sensor installed inside the external packaging body. Therefore, the hydrogen sulfide sensor detects hydrogen sulfide inside the external packaging body and the deterioration of the oxide layer and the like can be detected. The deteriorated portion of the oxide layer becomes a deliquesced portion including an oxide produced by a reaction of the sulfide-based solid electrolyte material with moisture originating from the external air or the like. When the deterioration of the oxide layer is detected in such a regeneration device, the device for drying the inside the external packaging body is actuated and the inside of the external packaging body can be dried. Therefore, the deliquesced portion is dried, moisture is removed, and the oxide layer containing substantially no moisture can be regenerated in the deteriorated portion. As a result, even when the deterioration occurs when the battery is used, the oxide layer in the deteriorated portion can be regenerated, the normal state of the oxide layer can be restored, and the deteriorated all-solid lithium secondary battery can be regenerated.

The regeneration device is not particularly limited, provided that the regeneration device has a drying device capable of drying the inside of the external packaging body and removing moisture therefrom and a hydrogen sulfide sensor installed inside the external packaging body and that the device for drying the inside of the external packaging body is actuated when the hydrogen sulfide sensor detects hydrogen sulfide contained in the external packaging body, the inside of the external packaging body is dried, moisture is removed therefrom, and the oxide layer containing substantially no moisture, which is produced by oxidation of the sulfide-based solid electrolyte material is regenerated. For example, a regeneration device for an all-solid lithium secondary battery, such as shown in a schematic general cross-sectional view in FIG. 10 can be used.

Figure 11:
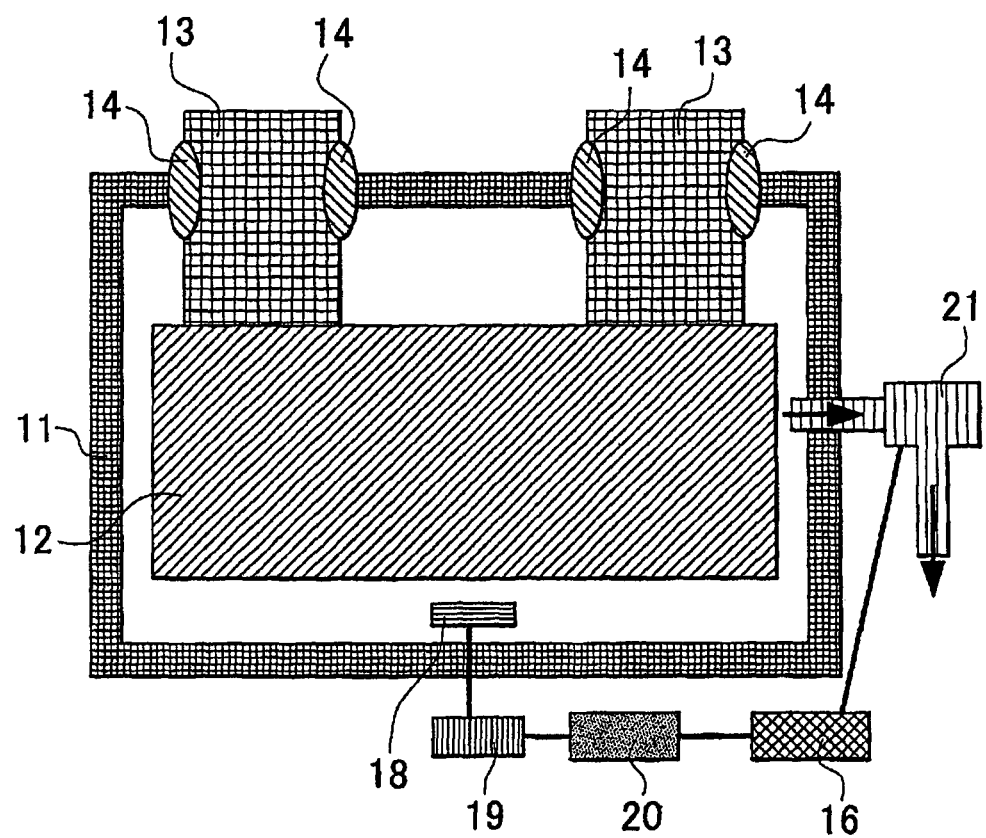
FIG. 11 is a schematic cross-sectional view illustrating an example of configuration of an all-solid lithium secondary battery regeneration device that is an embodiment of the invention.

Furthermore, for example, a regeneration device for an all-solid lithium secondary battery, such as shown in a schematic general cross-sectional view in FIG. 11 may be also used. In the regeneration device for an all-solid lithium secondary battery shown by way of example in FIG. 11, a power-generating element 12 including an oxide layer is installed inside an external packaging body 11 and terminals 13 are formed at one surface of the power-generating element 12 including an oxide layer, these terminals 13 extending to the outside of the external packaging body 11. A gap between the terminal 13 and the external packaging body 11 is sealed with insulating portions 14. Furthermore, a hydrogen sulfide sensor 18 is installed below the power-generating element 12 including an oxide layer in the lower portion of the external packaging body 11. An evacuation device 21 is installed outside the external packaging body 11 so that the pressure inside the external packaging body 11 can be reduced. The regeneration device further includes a computational unit 19 for computing the concentration of hydrogen sulfide from the signal of the hydrogen sulfide sensor 18 and the ECU 20 that performs electric controls such that when the computed and outputted hydrogen sulfide concentration is equal to or higher than a certain set value, this signal is processed, a signal is sent to a switch 16, and the evacuation device 21 is actuated. In such a regeneration device, when deterioration occurs, for example, due to cracking in the oxide layer formed in the power-generating element 12 and the sulfide-based solid electrolyte material located in the power-generating element 12 comes into contact and reacts with moisture originating from the external air or the like, hydrogen sulfide is generated. The hydrogen sulfide fills the inside of the external packaging body 11. Because the atmosphere inside the external packaging body 11 is usually the atmosphere, hydrogen sulfide, which is heavier than air, fills the lower inner portion of the external packaging body. This hydrogen sulfide can be detected with the hydrogen sulfide sensor 18. Because the computational unit 19 and ECU 20 are set so as to send a signal to the switch 16 and actuate the evacuation device 21 when the detected hydrogen sulfide concentration assumes a predetermined value, moisture contained inside the external packaging body can be removed to the outside of the external packaging body with the evacuation device 21 and the inside of the external packaging body 11 can be dried. As a result, the deliquesced portion including the oxide formed due to deterioration of the oxide layer can be dried, moisture can be removed therefrom, and the oxide layer containing substantially no moisture in the deteriorated portion can be regenerated. The deteriorated all-solid lithium secondary battery can thus be regenerated.

The regeneration device such as shown by way of example in the above-described FIGS. 10 and 11 is not particularly limited, provided that the regeneration device has at least the power-generating element including an oxide layer, device for drying the inside of the external packaging body, and hydrogen sulfide sensor inside the external packaging body. Thus, in addition to the configuration shown in FIGS. 10 and 11, the regeneration device may have other components such as a signal generation circuit, a linearizer, and a temperature sensor.

Furthermore, the regeneration may have both the above-described cooling element and evacuation device as the devices drying inside the external packaging body that are capable of drying the inside of the external packaging body and removing moisture therefrom. Each component will be described below in greater detail.

1. Power-Generating Element Including Oxide Layer

The power-generating element including an oxide layer is similar to that described in "A. All-solid lithium secondary battery; 1. Power-generating element including oxide layer". Therefore, the description thereof is herein omitted.

The size, form, and number of power-generating elements including an oxide layer is not particularly limited provided that they can function as a power-generating element including an oxide layer and the desired performance can be obtained. As for the form of the power-generating element including an oxide layer, the power-generating element including an oxide layer may be installed "as is", or the power-generating element including an oxide layer may be installed and sealed in a battery case or the like, such as shown by way of example in FIGS. 1 to 4. When the power-generating element including an oxide layer is sealed in a battery case or the like, the case can have a coin-like, laminate-like, cylindrical, or angular shape. Furthermore, a plurality of power-generating elements including an oxide layer may be connected in serial by a bus bar or the like.

2. Device for Drying the Inside of External Packaging Body

The device for drying the inside of the external packaging body is actuated when the hydrogen sulfide sensor detects hydrogen sulfide inside the external packaging body and can dry the inside of the external packaging body and remove moisture therefrom. By drying the inside of the external packaging body with such a drying device, it is possible to regenerate the oxide layer containing substantially no moisture, which is produced by oxidation of the sulfide-based solid electrolyte material.

The device for drying the inside of the external packaging body is not particularly limited, provided that this device can be actuated when the hydrogen sulfide sensor detects hydrogen sulfide inside the external packaging body and can dry the inside of the external packaging body and remove moisture therefrom, thereby making it possible to regenerate the oxide layer containing substantially no moisture, which is produced by oxidation of the sulfide-based solid electrolyte material. Examples of suitable devices for drying the inside of the external packaging body include a device including a cooling element and a moisture removing agent that adsorbs the moisture trapped by the cooling element, such a device being shown by way of example in FIG. 10, and an evacuation device shown by way of example in FIG. 11. These drying devices will be described below in greater detail.

(1) A device including a cooling element and a moisture removing agent that adsorbs the moisture trapped by the cooling element, more particularly a device including a cooling element and a moisture adsorber that adsorbs the moisture trapped by the cooling element, such as device being shown by way of example in FIG. 10, will be described below. In such a device, the cooling element collects moisture and the moisture adsorber adsorbs the moisture, thereby making it possible to dry the inside of the external packaging body and remove moisture therefrom.

The cooling element of the present embodiment will be described below. The cooling element itself is cooled and the cooled cooling element can collect moisture contained inside the external packaging body. The moisture thus collected is adsorbed by the below-described adsorber and trapped, thereby making it possible to remove very small amounts of moisture in a state in which the inside of the external packaging body is dried to a very high degree and the moisture content therein is every low. Thus, a deliquesced portion including an oxide formed due to deterioration of the oxide layer can be dried, moisture can be removed therefrom, and an oxide layer containing substantially no moisture can be regenerated in the deteriorated portion.

The cooling element is not particularly limited, provided that the element itself can be cooled, and moisture contained inside the external packaging body can be caused to condensate and can be retained on the cooled element. More specifically, the above-described Peltier element or a configuration in which a coolant or the like is introduced into the external packaging body from the outside of the external packaging body may be used. The Peltier element is preferred because it can be controlled by electric power and is easy to handle and install.

The plate for installing the cooling element is not particularly limited, provided that the deliquesced portion including an oxide formed due to the deterioration of the oxide layer produced by oxidation of the sulfide-based solid electrolyte material can be dried and moisture can be removed therefrom and that the oxide layer containing substantially no moisture can be regenerated in the deteriorated portion by collecting moisture located inside the external packaging body. However, it is preferred that the cooling element be installed between the power-generating element including an oxide layer and an insulating portion that seals the gap between the external packaging body and the terminals, that is, where moisture penetration from outside the external packaging body is highly probable.

Furthermore, in the present embodiment, electricity between the terminals can be also used. More specifically, when a Peltier element or the like is used as the cooling element, the Peltier element can be actuated by using electricity between the terminals.

The size, shape, and number of cooling elements are not particularly limited, provided that the deliquesced portion including an oxide formed due to deterioration of the oxide layer can be dried, moisture can be removed therefrom, and the oxide layer containing substantially no moisture can be regenerated in the deteriorated portion, and they can be appropriately selected according to the desired conditions.

A moisture adsorber of the present embodiment will be described below. The moisture adsorber is usually installed in a location such that the moisture located inside the external packaging body that has been trapped by the cooling element can be adsorbed. Therefore, moisture contained inside the external packaging body and condensed on the cooled cooling element can be reliably retained. As a result, the deliquesced portion including an oxide formed due to deterioration of the oxide layer can be dried, moisture can be more reliably removed therefrom, and the oxide layer containing substantially no moisture can be more reliably regenerated in the deteriorated portion.

The moisture adsorber is not particularly limited, provided that moisture condensed on and collected by the cooled cooling element can be adsorbed and reliably retained. Specific examples of suitable moisture adsorbers include $P_2O_5$, zeolites, silica gel, and active carbon. The preferred among them is $P_2O_5$.

A location for installing the moisture adsorber is not particularly limited, provided that moisture condensed on and collected by the cooled cooling element can be reliably held, adsorbed and reliably retained, and the location can be changed according to the size, shape, and the like of the cooling element. More specifically, the moisture adsorbent may be installed in a portion where condensation on the cooling element occurs or so as to envelope the entire cooling element. Furthermore, the moisture adsorbent may be installed in the vicinity of the cooling element. Among these locations, the preferred one is on the cooling element where the amount of the moisture adsorber can be small, the installation is simple, and moisture collected by the cooling element can be adsorbed more reliably.

The size, shape, and number of moisture adsorbers change according to the size, shape, and number of cooling elements, are not particularly limited, and can be selected according to the desired conditions, provided that moisture located on the cooled cooling element can be adsorbed and reliably retained and the oxide layer containing substantially no moisture can be regenerated in the deteriorated portion of the oxide layer.

(2) Evacuation Device

An evacuation device of the present embodiment, such as shown by way of example in FIG. 11 will be described below. With such a device, moisture can be reliably removed by maintaining the inside of the external packaging body under a reduced pressure. The evacuation device can release moisture contained in the external packaging body from the external packaging body to the outside of the external packaging body by discharging the moisture contained in the external packaging body to the outside of the external packaging body, for example, as shown by an arrow in FIG. 11, and reducing the pressure inside the external packaging body. As a result, it is possible to remove very small amounts of moisture in a state in which the inside of the external packaging body is dried to a very high degree and the moisture content therein is very low. Thus, a deliquesced portion including an oxide formed due to deterioration of the oxide layer can be dried, moisture can be removed therefrom, and an oxide layer containing substantially no moisture can be regenerated in the deteriorated portion.

The evacuation device is not particularly limited, provided that moisture contained in the external packaging body can be discharged to the outside of the external packaging body and the inside of the external packaging body can be maintained under a predetermined reduced pressure and dried. A vacuum pump is a specific example of such an evacuation device.

A state with reduced pressure inside the external packaging body that is obtained by evacuation with the evacuation device is not particularly limited, provided that moisture that has penetrated into the external packaging body can be reliably released therefrom, the deliquesced portion including an oxide formed due to deterioration of the oxide layer can be dried, moisture can be removed therefrom, and an oxide layer containing substantially no moisture can be regenerated in the deteriorated portion. More specifically, the pressure attained with the evacuation is equal to or less than 0.1 atm, more preferably equal to or less than 0.05 atm, and especially preferably equal to or less than 0.01 atm.

A location for installing the evacuation device such as shown by way of example in FIG. 11 is not particularly limited, provided that the evacuation device is installed integrally with the external packaging body outside the external packaging body, the desired reduced pressure can be obtained inside of the external packaging body, and a desired oxide layer containing substantially no moisture can be regenerated in the portion with the deteriorated oxide layer. For example, the evacuation device can be installed in a location adjacent to the external packaging body outside the external packaging body where moisture contained in the external packaging body can be discharged from the side surface of the external packaging body.

The performance and number of evacuation devices is not particularly limited, provided that the desired reduced pressure can be obtained inside of the external packaging body, and a desired oxide layer containing substantially no moisture can be regenerated in the portion with the deteriorated oxide layer, and can be appropriately selected according to the desired conditions.

3. Hydrogen Sulfide Sensor

The hydrogen sulfide sensor is installed in a predetermined position inside the external packaging body and can detect hydrogen sulfide. The deliquesced portion can be dried, moisture can be removed therefrom, and the oxide layer containing substantially no moisture can be regenerated by actuating the device for drying the inside of the external packaging body, such as the cooling element shown by way of example in FIG. 10 or the evacuation device shown by way of example in FIG. 11, after the hydrogen sulfide sensor has detected hydrogen sulfide inside the external packaging body.

After the hydrogen sulfide sensor has detected hydrogen sulfide, the cooling element (Peltier element) or the like can be actuated at a desired timing by computations and output performed by the computation unit, ECU, and switch shown in FIG. 10 and FIG. 11. For example, where a predetermined concentration of hydrogen sulfide inside the external packaging body is set by the ECU or the like, moisture located inside the external packaging body can be removed by actuating the cooling device or the like when the hydrogen sulfide concentration detected by the hydrogen sulfide sensor becomes equal to or higher than the predetermined value. The set value of the hydrogen sulfide concentration, such that actuates the device for drying the inside of the external packaging body, such as a cooling element (Peltier element) changes depending on the configuration and size of the above-described regeneration device, position of the hydrogen sulfide sensor, and the like, and a set value determined e.g. by preliminary tests using the regeneration device to be employed can be used appropriately.

The hydrogen sulfide sensor is not particularly limited, provided that it can detect hydrogen sulfide inside the external packaging body. Specific examples of suitable sensors include an electrolytic sensor, a thin-film sensor, a ceramic sensor, an organic material sensor, and electrolytic material sensor, and a thermocouple sensor.

The position for installing the hydrogen sulfide sensor is not particularly limited, provided that hydrogen sulfide located inside the external packaging body can be detected and the device for drying the inside of the external packaging body, such as the cooling element, can be actuated at a desired timing. This position can also vary depending on the atmosphere inside the external packaging body. For example, the external packaging body is usually filled with air, and because hydrogen sulfide is heavier than air, hydrogen sulfide fills the lower inner portion of the external packaging body. From this standpoint, the hydrogen sulfide sensor can be installed in the lower inner portion of the external packaging body.

The size, shape, and number of the sensors are not particularly limited, provided that moisture contained in the external packaging body can be effectively removed and the oxide layer containing substantially no moisture can be regenerated by detecting hydrogen sulfide inside the external packaging body and actuating the device for drying the inside of the external packaging body, such as the cooling element, at a desired timing.

4. Other

In the regeneration device for the all-solid lithium secondary battery of the present embodiment, components other than the above-described power-generating element including an oxide layer, device for drying the inside of the external packaging body, and hydrogen sulfide sensor, for example, the external packaging body, terminals, insulating portion, switch, computational unit, and ECU are not particularly limited, and components similar to those usually employed can be used.

The application of the regeneration device of the present embodiment is not particularly limited. For example, it can be used as a regeneration device for an all-solid lithium secondary battery for an automobile.

The invention is not limited to the above-described embodiments. Thus, the above-described embodiments are merely exemplary embodiments.

The embodiments of the invention will be described below in greater detail by describing examples thereof.

Example 1

(Formation of all-solid lithium secondary battery) An all-solid lithium secondary battery was formed under an Ar atmosphere. First, a total of 65 mg of a 70$Li_2$S-30$P_2O_5$ powder was introduced as a solid electrolyte material into a molding jig. Then, a positive electrode mixed material prepared by mixing 11 mg of a positive electrode active material ($LiCoO_2$) and 5 mg of a solid electrolyte material (70$Li_2$S-30$P_2O_5$) was introduced into the molding jig and press molded under 1 t/$cm^2$, the solid electrolyte material and the positive electrode mixed material were integrated, and a solid electrolyte layer and a positive electrode layer were formed. Then, a negative electrode mixed material was obtained by mixing 4.3 mg of a negative electrode active material (graphite (SFG15, manufactured by Timcal Co.) and 4.3 mg of a solid electrolyte material ($70Li_2S-30P_2O_5$). The negative electrode mixed material was introduced into the molding jig in the order such that the solid electrolyte layer was sandwiched between the positive electrode layer and the negative electrode layer. Then press molding was performed under 5 t/cm$^2$, the negative electrode mixed material was integrated, the negative electrode layer was formed, and an all-solid lithium secondary battery pellet was obtained in which the solid electrolyte layer was sandwiched between the positive electrode layer and the negative electrode layer. The all-solid lithium secondary battery pellet was sandwiched between the collectors made from SUS and the side surface thereof was covered with an insulating ring made from polyethylene terephthalate (PET), thereby producing an all-solid lithium secondary battery. (Formation of oxide layer) The obtained all-solid lithium secondary battery was exposed for 5 min to the air (air temperature 25° C., humidity 35%) and then vacuum dried (holding for 10 min under 0.01 atm) to form an oxide layer produced by oxidation of the sulfide-based solid electrolyte material in a predetermined position and obtain an all-solid lithium secondary battery including the oxide layer.

Example 2

An all-solid lithium secondary battery including an oxide layer was obtained by using the all-solid lithium secondary battery obtained in the same manner as in Example 1 and forming an oxide layer in a desired position by repeating twice the air exposure for 5 min and vacuum drying (holding for 10 min under 0.01 atm) in the same manner as in Example 1.

Example 3

An all-solid lithium secondary battery including an oxide layer was obtained by using the all-solid lithium secondary battery obtained in the same manner as in Example 1 and forming an oxide layer in a desired position by repeating three times the air exposure for 5 min and vacuum drying (holding for 10 min under 0.01 atm) in the same manner as in Example 1.

Example 4

An all-solid lithium secondary battery including an oxide layer was obtained by using the all-solid lithium secondary battery obtained in the same manner as in Example 1 and forming an oxide layer in a desired position by repeating three times the air exposure for 5 min and vacuum drying (holding for 10 min under 0.01 atm) in the same manner as in Example 1 and then further performing the air exposure for 60 min (air temperature 25° C., humidity 35%) and vacuum drying (vacuum drying conditions are similar to those of Example 1).

Comparative Example

An all-solid lithium secondary battery was obtained by using the all-solid lithium secondary battery obtained in the same manner as in Example 1, without air exposure and vacuum drying.

Figure 12:
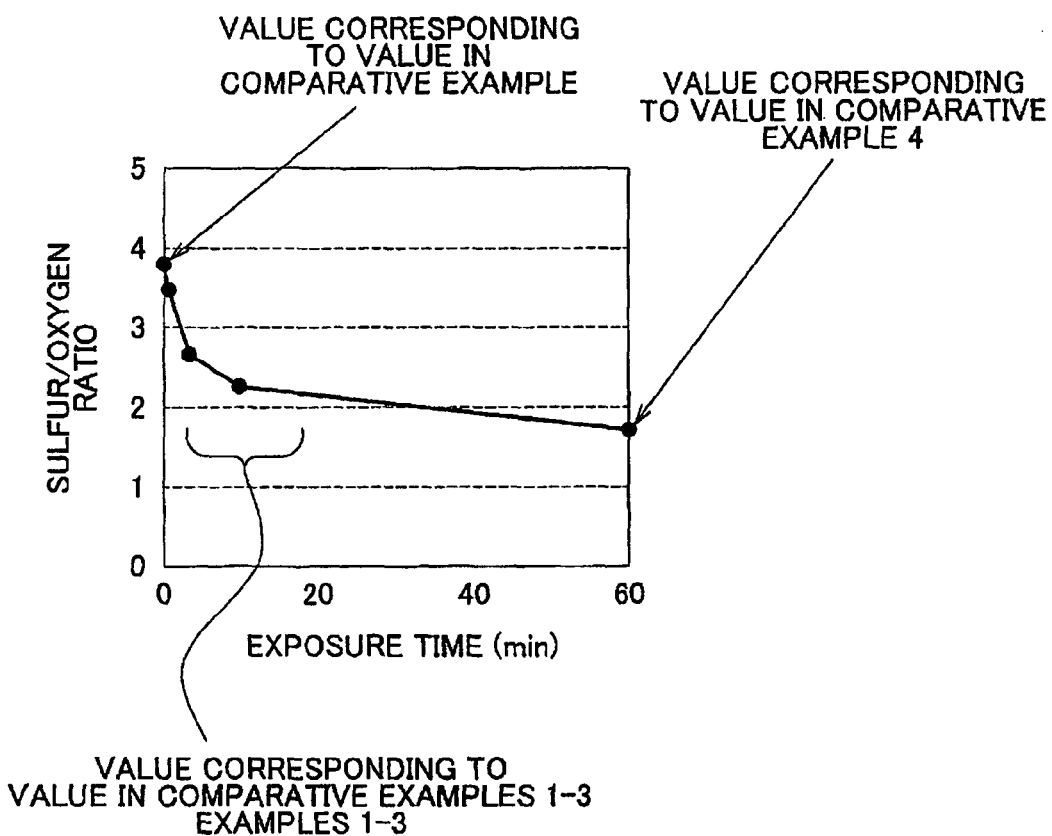
FIG. 12 is a graph in which a sulfur/oxygen element ratio of the solid electrolyte layer surface is plotted against the total time of exposure to air.

Evaluation (Measurement of sulfur/oxygen element ratio) A solid electrolyte layer pellet containing only the solid electrolyte ($70Li_2S-30P_2O_5$) was fabricated and a sulfur/oxygen element ratio on the surface of the solid electrolyte layer obtained with various air exposure times was measured by XPS. The results obtained were plotted against the total time of air exposure. The plot is shown in FIG. 12. As shown in FIG. 12, the sulfur/oxygen element ratio on the surface of the solid electrolyte layer decreases with the increase in the total time of air exposure, and the value that would be obtained in Comparative Example is about 4. By contrast he value that would be obtained in Example 1 to Example 3 is equal to or less than 3, and the value that would be obtained in Example 4 is equal to or less than 2. (Measurement of battery resistance) Battery resistance was measured using the all-solid lithium secondary batteries obtained in Examples 1 to 4 and Comparative Example. After conditioning at 3.0 V to 4.1 V, voltage was adjusted to 3.96 V and a battery resistance was measured by an alternating current impedance method at a temperature of 25° C. and a frequency of 10 mHz to 100 kHz. The resistance values obtained are shown in Table 1. (Measurement of hydrogen sulfide concentration) Hydrogen sulfide concentration was measured using the all-solid lithium secondary batteries obtained in Examples 1 to 4 and Comparative Example. The all-solid lithium secondary batteries obtained in Examples 1 to 4 and Comparative Example were placed in air-tight containers and hydrogen sulfide concentration after introducing air for 100 sec (air temperature 25° C., humidity 35%) was measured with a hydrogen sulfide sensor ($H_2S$ Detector, manufactured by Jico Co.). The obtained hydrogen sulfide concentrations after 100 sec are shown in Table 1.

TABLE 1

Battery Resistance and Hydrogen sulfide concentration

|  | Resistance Ω | Hydrogen sulfide concentration after 100 sec ppm |
|---|---|---|
| Comparative Example | 88.9 | 21 |
| Example 1 | 88.6 | 6 |
| Example 2 | 91.8 | 2 |
| Example 3 | 93 | 1 |
| Example 4 | 99.4 | 0 |

As shown in Table 1, the resistance was the lowest in Comparative Example in which air exposure and vacuum drying were not preformed, and the resistance was higher in Example 1 to Example 4 in which the oxide layer was formed in a desired position because of the air exposure and vacuum drying, but the results were good. Furthermore, in Example 1 to Example 4, the resistance tended to increase with the increase in the number of cycles and time of air exposure and vacuum drying.

Furthermore, hydrogen sulfide concentration assumed the highest value of 21 ppm in Comparative Example in which air exposure and vacuum drying were not preformed, and hydrogen sulfide concentration decreased significantly and good values were obtained in Example 1 to Example 4 in which the oxide layer was formed in a desired position because of the air exposure and vacuum drying. Furthermore, in Example 1 to Example 4, the hydrogen sulfide concentration tended to decrease with the increase in the number of cycles and time of air exposure and vacuum drying and was 0 ppm in Example 4.

The above-described results indicate that in the examples, water resistance of the all-solid lithium secondary battery could be increased due to the presence of the power-generating element including an oxide layer having substantially no moisture in a zone where the electrolyte-containing layer including the sulfide-based solid electrolyte material was in contact with the external air. Thus, because of the aforementioned oxide layer, the reaction of the sulfide-based solid electrolyte material contained in the power-generating element including an oxide layer with moisture contained in the external air could be inhibited and water resistance could be increased. In the examples illustrated by Table 1, the generation of hydrogen sulfide in Example 2, Example 3, and Example 4 was lower than that in Example 1. This result and the results of the above-described tests demonstrated that the generation of hydrogen sulfide could be further inhibited by setting the sulfur/oxygen element ratio of the oxide layer to a value equal to or less than 3. Thus, it was found that the preferred sulfur/oxygen element ratio of the oxide layer is equal to or less than 3.

The invention claimed is:

1. An all-solid lithium secondary battery comprising:
a power-generating element including an electrolyte-containing layer containing at least a sulfide-based solid electrolyte material; and
an oxide layer containing substantially no moisture, the oxide layer being produced by oxidation of the sulfide-based solid electrolyte material and being provided only at an outer peripheral portion of the electrolyte-containing layer, wherein
the oxide layer is obtained by exposing a portion of sulfide-based solid electrolyte material to a gas that includes moisture, the portion of the sulfide-based electrolyte material being positioned at the outer peripheral portion of the electrolyte-containing layer.

2. The all-solid lithium secondary battery according to claim 1, wherein the electrolyte-containing layer comprises a solid electrolyte layer, a positive electrode layer, and a negative electrode layer.

3. The all-solid lithium secondary battery according to claim 1, wherein a sulfur/oxygen element ratio of the oxide layer is equal to or less than 3.

4. The all-solid lithium secondary battery according to claim 3, wherein the sulfur/oxygen element ratio of the oxide layer is from 1 to 3.

5. The all-solid lithium secondary battery according to claim 4, wherein the sulfur/oxygen element ratio of the oxide layer is from 2 to 2.5.

6. The all-solid lithium secondary battery according to claim 1, wherein
(oxide layer volume)/(oxide layer volume+electrolyte-containing layer volume)×100 is equal to or less than 5%.

7. The all-solid lithium secondary battery according to claim 6, wherein
(oxide layer volume)/(oxide layer volume+electrolyte-containing layer volume)×100 is equal to or less than 3%.

8. The all-solid lithium secondary battery according to claim 7, wherein
(oxide layer volume)/(oxide layer volume+electrolyte-containing layer volume)×100 is equal to or less than 1%.

9. A vehicle comprising the all-solid lithium secondary battery according to claim 1.

10. A method for manufacturing an all-solid lithium secondary battery, comprising:
exposing a power-generating element having an electrolyte-containing layer containing a sulfide-based solid electrolyte material to a gas containing moisture and
causing the sulfide-based solid electrolyte material to absorb the moisture, thereby forming a deliquesced portion containing a[n] sulfide based oxide at least in a zone where the electrolyte-containing layer is in contact with the gas containing moisture and
drying the deliquesced portion to remove the moisture and forming a[n] sulfide based oxide layer containing substantially no moisture, wherein
the sulfide based oxide layer is provided only at an outer peripheral portion of the electrolyte-containing layer.

11. A regeneration method for an all-solid lithium secondary battery having a power-generating element that has formed therein the oxide layer containing substantially no moisture, which is produced by oxidation of a sulfide-based solid electrolyte material in a zone where an electrolyte-containing layer containing at least the sulfide-based solid electrolyte material is in contact with a gas containing moisture, wherein
whether a deliquesced portion comprising an oxide has been formed in the power-generating element is detected by detecting hydrogen sulfide after the all-solid lithium secondary battery has been used;
the deliquesced portion is dried to remove moisture after the formation of the deliquesced portion has been detected and the oxide layer containing substantially no moisture, which is produced by oxidation of the sulfide-based solid electrolyte material is regenerated; and
the oxide layer is provided only at an outer peripheral portion of the electrolyte-containing layer.

12. The regeneration method according to claim 11, wherein the deliquesced portion is determined to have been formed when a concentration of the hydrogen sulfide is equal to or higher than a predetermined value.

13. A regeneration device for an all-solid lithium secondary battery having a power-generating element that has formed therein the oxide layer containing substantially no moisture, which is produced by oxidation of a sulfide-based solid electrolyte material in a zone where an electrolyte-containing layer containing at least the sulfide-based solid electrolyte material is in contact with a gas containing moisture, comprising:
an external packaging body where the power-generating element is air tightly sealed;
a drying device capable of drying the inside of the external packaging body and removing moisture therefrom;
a hydrogen sulfide sensor installed inside the external packaging body; and
a controller that actuates the drying device so as to dry the inside of the external packaging body and remove moisture therefrom and to regenerate the oxide layer containing substantially no moisture, which is produced by oxidation of the sulfide-based solid electrolyte material, on the basis of detection of hydrogen sulfide contained in the external packaging body by the hydrogen sulfide sensor, wherein
the oxide layer is provided only at an outer peripheral portion of the electrolyte-containing layer.

14. The regeneration device according to claim 13, wherein the drying device comprises a cooling element and a moisture adsorber.

15. The regeneration device according to claim 13, wherein the drying device comprises an evacuation device.

16. The regeneration device according to claim 15, wherein the evacuation device evacuates an air in the external packaging body so that a pressure inside the external packaging body equal to or less than 0.1 atm.

17. The regeneration device according to claim 16, wherein the evacuation device evacuates an air in the external packaging body so that a pressure inside the external packaging body equal to or less than 0.05 atm.

18. The regeneration device according to claim 17, wherein the evacuation device evacuates an air in the external packaging body so that a pressure inside the external packaging body equal to or less than 0.01 atm.

19. The regeneration device according to claim 13, wherein the hydrogen sulfide sensor is provided in the lower portion of the external packaging body.

20. The regeneration device according to claim 13, wherein
the hydrogen sulfide sensor detects a concentration of hydrogen sulfide; and
the controller determines that the deliquesced portion has been formed and actuates the drying device when the concentration of hydrogen sulfide becomes equal to or higher than a predetermined value.

21. The all-solid lithium secondary battery according to claim 1, wherein the oxide layer containing substantially no moisture contains an amount of moisture such that substantially no hydrogen sulfide is generated by the reaction between the sulfide-based solid electrolyte and the moisture contained in the oxide layer.

22. The all-solid lithium secondary battery according to claim 21, wherein the oxide layer containing substantially no moisture contains an amount of moisture that is equal to or less than 1000 ppm.

23. The method according to claim 10, wherein the oxide layer containing substantially no moisture contains an amount of moisture such that substantially no hydrogen sulfide is generated by the reaction between the sulfide-based solid electrolyte and the moisture contained in the oxide layer.

24. The method according to claim 23, wherein the oxide layer containing substantially no moisture contains an amount of moisture that is equal to or less than 1000 ppm.

25. The regeneration method according to claim 11, wherein the oxide layer containing substantially no moisture contains an amount of moisture such that substantially no hydrogen sulfide is generated by the reaction between the sulfide-based solid electrolyte and the moisture contained in the oxide layer.

26. The regeneration method according to claim 25, wherein the oxide layer containing substantially no moisture contains an amount of moisture that us equal to or less than 1000 ppm.

27. The regeneration device according to claim 13, wherein the oxide layer containing substantially no moisture contains an amount of moisture such that substantially no hydrogen sulfide is generated by the reaction between the sulfide-based solid electrolyte and the moisture contained in the oxide layer.

28. The regeneration device according to claim 27, wherein the oxide layer containing substantially no moisture contains an amount of moisture that is equal to or less than 1000 ppm.

* * * * *